US011142846B2

(12) United States Patent
Jin et al.

(10) Patent No.: US 11,142,846 B2
(45) Date of Patent: *Oct. 12, 2021

(54) METHOD FOR COLLECTING A NANOSCALE OR SUBMICRON SCALE POLYMER FIBER WEB

(71) Applicant: SHPP Global Technologies B.V., Bergen op Zoom (NL)

(72) Inventors: Xuezhi Jin, Branford, CT (US); Richard Peters, Hinsdale, MA (US); Evelyn Pearson, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,771

(22) Filed: Mar. 15, 2021

(65) Prior Publication Data

US 2021/0222328 A1 Jul. 22, 2021

Related U.S. Application Data

(62) Division of application No. 16/475,745, filed as application No. PCT/US2018/012531 on Jan. 5, 2018, now Pat. No. 10,947,643.

(Continued)

(51) Int. Cl.
 B65H 16/00 (2006.01)
 B65H 51/08 (2006.01)
 (Continued)

(52) U.S. Cl.
 CPC .......... *D01D 5/0069* (2013.01); *D01D 5/003* (2013.01); *D01D 5/0038* (2013.01);
 (Continued)

(58) Field of Classification Search
 CPC .... B65H 16/00; B65H 18/103; B65H 18/145; B65H 23/1806; B65H 51/08; B65H 51/12;
 (Continued)

(56) References Cited

U.S. PATENT DOCUMENTS

| 2009/0312166 A1 | 12/2009 | Ichikawa et al. |
| 2016/0229104 A1* | 8/2016 | Mouthuy ............. D01D 5/0038 |
| 2017/0232134 A1* | 8/2017 | Clare ..................... A61L 27/20 424/488 |

FOREIGN PATENT DOCUMENTS

| AU | 2014206173 A1 | 8/2014 |
| WO | 2009010020 A2 | 1/2009 |

(Continued)

OTHER PUBLICATIONS

International Preliminary Report on Patentability; International Application No. PCT/US2018/012531; International Filing Date: Jan. 5, 2018; 19 pages.

(Continued)

*Primary Examiner* — Leo B Tentoni
(74) *Attorney, Agent, or Firm* — Cantor Colburn LLP

(57) ABSTRACT

A continuous wire drive system for a needleless electrospinning apparatus, the electrospinning apparatus including an electrospinning enclosure and within which a nanoscale or submicron scale polymer fiber web is formed onto a substrate from a liquid polymer layer coated onto a plurality of continuous electrode wires passing through the electrospinning enclosure. The continuous wire drive system includes a master wire drive drum and a slave wire drive drum, each of the master wire drive drum and slave wire drive drum including a plurality of wire guides, each of the wire guides including a channel or groove for receiving one of the plurality of continuous electrode wires. The continuous wire drive system is external to the electrospinning apparatus, (Continued)

and the continuous wire drive system drives the plurality of continuous electrode wires through the electrospinning enclosure.

6 Claims, 14 Drawing Sheets

Related U.S. Application Data

(60) Provisional application No. 62/443,111, filed on Jan. 6, 2017.

(51) Int. Cl.
| | | |
|---|---|---|
| *B65H 51/12* | (2006.01) | |
| *B65H 57/04* | (2006.01) | |
| *B65H 57/16* | (2006.01) | |
| *B65H 59/10* | (2006.01) | |
| *B65H 59/18* | (2006.01) | |
| *D01D 7/00* | (2006.01) | |
| *D01D 10/06* | (2006.01) | |
| *F26B 3/04* | (2006.01) | |
| *D01D 5/00* | (2006.01) | |
| *D01D 13/02* | (2006.01) | |
| *D01F 13/00* | (2006.01) | |
| *B65H 18/10* | (2006.01) | |
| *B65H 18/14* | (2006.01) | |
| *B65H 23/18* | (2006.01) | |

(52) U.S. Cl.
CPC ......... *D01D 5/0061* (2013.01); *D01D 5/0076* (2013.01); *D01D 13/02* (2013.01); *D01F 13/00* (2013.01); *B65H 18/103* (2013.01); *B65H 18/145* (2013.01); *B65H 23/1806* (2013.01); *B65H 2701/36* (2013.01)

(58) Field of Classification Search
CPC ........ B65H 57/04; B65H 57/16; B65H 59/10; B65H 59/18; B65H 2701/36; D01D 5/003; D01D 5/0038; D01D 5/0061; D01D 5/0069; D01D 5/0076; D01D 7/00; D01D 10/06; F26B 3/04
USPC ...... 264/211.12, 211.13, 234, 464, 465, 466, 264/484; 34/459; 242/147 R, 155 R, 242/157 R, 410, 472.8, 615.2, 615.3
See application file for complete search history.

(56) References Cited

FOREIGN PATENT DOCUMENTS

| WO | 2018129244 A1 | 7/2018 |
|---|---|---|
| WO | 2018129264 A1 | 7/2018 |

OTHER PUBLICATIONS

International Search Report; International Application No. PCT/US2018/012531; International Filing Date: Jan. 5, 2018; dated May 23, 2018; 5 pages.

Written Opinion; International Application No. PCT/US2018/012531; International Filing Date: Jan. 5, 2018; dated May 23, 2018; 9 pages.

* cited by examiner

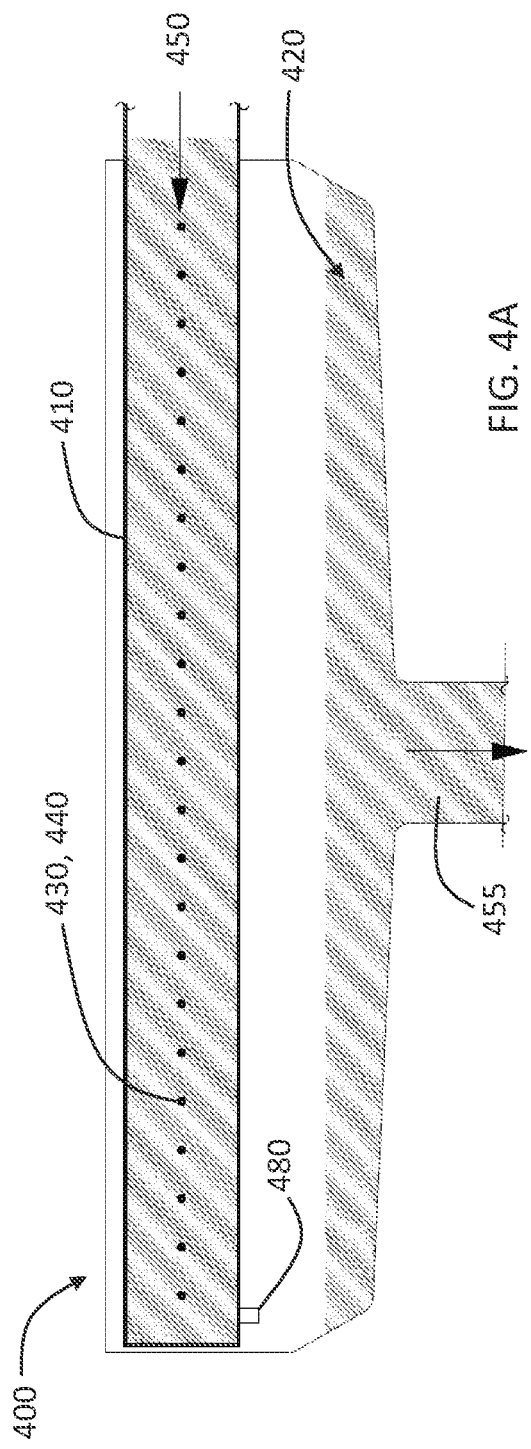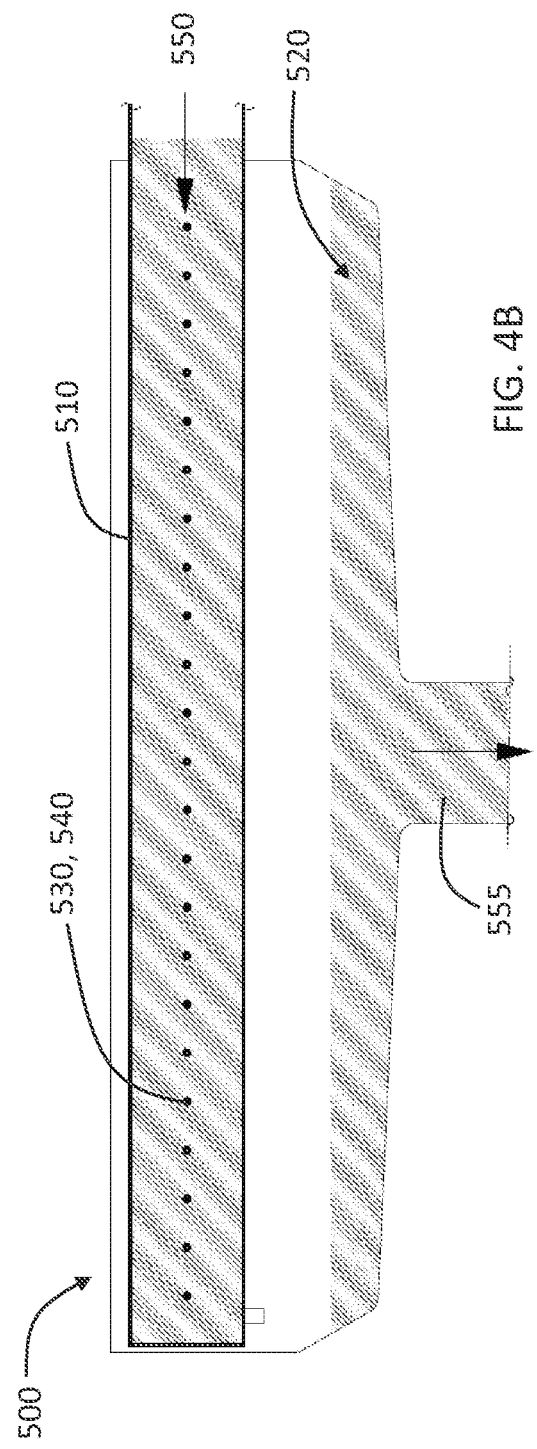

METHOD FOR COLLECTING A NANOSCALE OR SUBMICRON SCALE POLYMER FIBER WEB

CROSS REFERENCE TO RELATED APPLICATIONS

This application is a divisional application of U.S. application Ser. No. 16/475,745, filed on Jul. 3, 2019, now issued as U.S. Pat. No. 10,947,643, which is a 371 of International Application No. PCT/US2018/012531, filed Jan. 5, 2018, which claims priority to U.S. Provisional Application No. 62/443,111, filed Jan. 6, 2017, all of which are incorporated by reference herein in their entirety.

FIELD OF THE DISCLOSURE

The present disclosure relates an apparatus and methods for electrospinning liquid polymer into nanoscale or submicron scale fibers, and more particularly to electrospinning liquid polymer into nanoscale or submicron scale fibers without the use of conventional nozzles or needles.

BACKGROUND OF THE DISCLOSURE

Fibers in the nanoscale or submicron scale are useful in a variety of applications, including filtration, tissue engineering, protective clothing, composites, battery separators, energy storage, etc. Electrospinning is one of the methods used to generate high quality fibers on this scale. While electrospinning is relatively easy to do, however, it has very low throughput and subsequently, a very high production cost. Therefore, it is not cost effective to electrospin nanoscale and/or submicron scale fibers in large quantities. Accordingly, other than for high-value applications, electrospinning of nanofibers has been largely contained to academic research.

Production rates in current injection nozzle, needle-jet and spinning jet manufacturing processes typically range from about 0.05 grams per hour (g/hr) to about 0.15 g/hr per nozzle/jet. Several methods have been studied and/or used to improve the production rate. These methods include gas-assisted electrospinning; the use of multi-nozzle systems; the use of nozzle-less/needleless systems; and increasing the total number spinning jets. Each of these methods has its problems, however, resulting in maximum sustained production rates of no more than about 2 kilograms per hour (kg/hr) per (commercially available) machine. Problems associated with nozzle/needle systems include: clogging of the injection nozzle/needle orifice; difficulty optimizing the nozzle array; and difficulty maintaining uniform feed rate through each nozzle. Problems associated with nozzle-less/needleless systems include: inability to control solvent evaporation from the solution reservoir, resulting in solution concentration and viscosity variations; and polymer layer coating build-up on the surface of the electrospinning element resulting in a substantial decrease in the fiber spinning rate.

These and other shortcomings are addressed by aspects of the present disclosure.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIG. 4A is a detail in section taken on the line B-B of FIG. 2.

FIG. 4B is a side view of an exemplary electrode wire cleaning assembly according to an aspect of the disclosure.

SUMMARY

Figure 1:
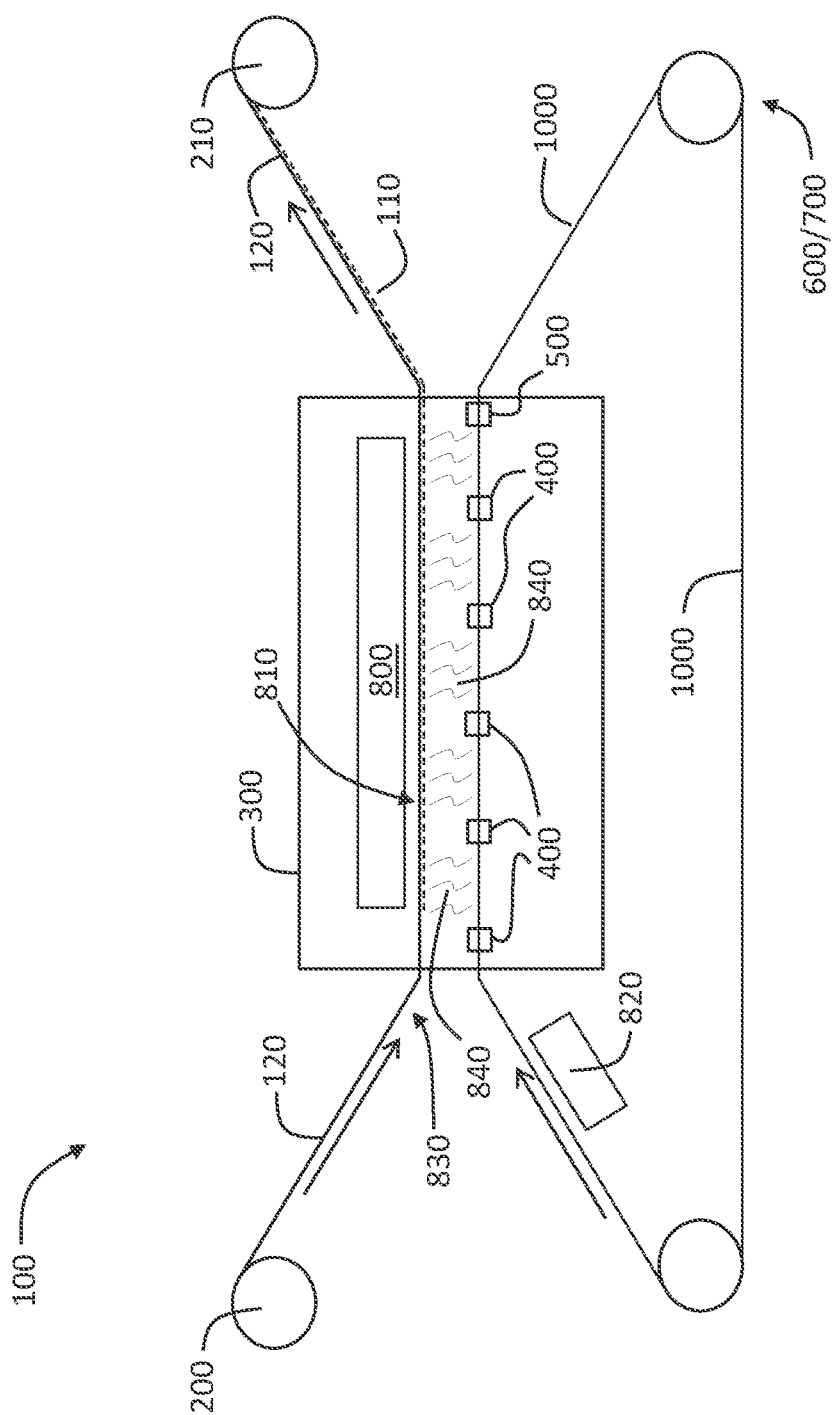
FIG. 1 is a side view of a simplified electrospinning apparatus according to an aspect of the disclosure.

Aspects of the disclosure relate to a continuous wire drive system for a needleless electrospinning apparatus, the electrospinning apparatus including an electrospinning enclosure and within which a nanoscale or submicron scale polymer fiber web is formed onto a substrate from a liquid polymer layer coated onto a plurality of continuous electrode wires passing through the electrospinning enclosure. The continuous wire drive system includes a master wire drive drum and a slave wire drive drum, each of the master wire drive drum and slave wire drive drum including a plurality of wire guides, each of the wire guides including a channel or groove for receiving one of the plurality of continuous electrode wires. The continuous wire drive system is external to the electrospinning apparatus, and the continuous wire drive system drives the plurality of continuous electrode wires through the electrospinning enclosure.

Aspects of the disclosure further relate to methods for driving a plurality of continuous electrode wires through an electrospinning apparatus including an electrospinning enclosure and within which a nanoscale or submicron scale polymer fiber web is formed onto a substrate from a liquid polymer layer coated onto the plurality of continuous electrode wires. The method includes: arranging a plurality of continuous electrode wires onto a master wire drive drum and a slave wire drive drum; and rotating the master wire drive drum to drive the plurality of continuous electrode wires through the electrospinning enclosure. Each of the master wire drive drum and the slave wire drive drum include a plurality of wire guides, each of the wire guides including a channel or groove for receiving one of the plurality of continuous electrode wires. The master wire drive drum and the slave wire drive drum are external to the electrospinning apparatus.

Further aspects of the disclosure relate to methods for collecting a nanoscale or submicron scale polymer fiber web from an electrospinning enclosure including an electrospinning zone and within which a nanoscale or submicron scale polymer fiber web is formed onto a substrate from a liquid polymer layer coated onto a plurality of continuous electrode wires. The method includes: unrolling the substrate from a substrate supply roller; tensioning the substrate with a substrate tensioner; driving the substrate through the electrospinning enclosure and electrospinning zone substantially parallel to the plurality of continuous electrode wires having the liquid polymer layer coated thereon; electrospinning nanoscale or submicron scale polymer fibers from the liquid polymer layer coated onto the plurality of continuous electrode wires in the electrospinning zone; collecting the nanoscale or submicron scale polymer fibers on the substrate as a polymer fiber web; and driving the polymer fiber web and the substrate out of the electrospinning enclosure.

DETAILED DESCRIPTION

The present disclosure can be understood more readily by reference to the following detailed description of the disclosure and the Examples included therein. In various aspects, the present disclosure pertains to apparatus and methods for electrospinning a polymer fiber web onto a substrate and collecting it onto a roller. The apparatus and methods described herein allow the production of nanoscale or submicron scale fibers at a much higher throughput and production intensity and with much lower capital investment and production cost relative to that by the current available and known electrospinning methods.

Before the present compounds, compositions, articles, systems, devices, and/or methods are disclosed and described, it is to be understood that, unless otherwise specified, they are not limited to a specific polymer material, or to a particular status of polymer material (i.e., melt or solution), or to a particular type of solvent used to prepare a polymer solution, or to particular operating conditions (e.g., polymer wt % in the solution, additives in a polymer solution, temperature, voltage, distance of the electric field, etc.), or to particular apparatus dimensions and materials of construction (e.g., the composition of the electrode wires, the length of continuous electrode wires, the distance between parallel electrode wires, the number of polymer coating devices in one electrode wire pass, the distance between two liquid polymer coating devices, etc.), and as such these parameters can vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Electrospinning Apparatus

With reference to FIGS. 1 to 12, aspects of the disclosure relate to an apparatus 100 for electrospinning a polymer fiber web 110 onto a substrate 120. A simplified schematic diagram of the apparatus 100 is illustrated in FIG. 1. Particular components of the apparatus include an electrospinning enclosure 300, at least one liquid polymer coating device 400, a wire drive system 600, a wire tensioning system 700, an electrically conductive ground plate 800 and at least one high voltage power supply unit 820 that applies a high voltage to the plurality of continuous electrode wires 1000. A substrate 120 is unrolled from a substrate supply roller 200 and driven through the electrospinning enclosure. A plurality of continuous electrode wires 1000 are driven through the electrospinning enclosure generally parallel to the face of the moving substrate 120 by the wire drive system 600 and wire tensioning system 700. The moving directions of the plurality of continuous electrode wires 1000 and substrate 120 could either be co-current or counter-current. The plurality of continuous electrode wires 1000 are coated with a layer of liquid polymer in each of the at least one liquid polymer coating devices 400, and the voltage difference between the high voltage applied to the plurality of continuous electrode wires 1000 by the at least one high voltage power supply unit 820 and the electrically conductive ground plate 800 causes many liquid Taylor Cone jets 840 to erupt from the surface of the plurality of continuous electrode wires 1000, contact the substrate 120, and form a polymer fiber web 110 on the substrate 120. The polymer fiber web 110 and substrate 120 exit the electrospinning enclosure 300 and are collected by, e.g., winding them onto a combination roller 210 (as shown in FIG. 1), or in other aspects by separating the polymer fiber web 110 from the substrate 120 and winding them onto separate fiber web rollers as described herein. A wire cleaning assembly 500 removes excess liquid polymer as well as any solidified polymer from the surface of the plurality of continuous electrode wires 1000. The components and operation of the apparatus 100 are described in further detail below.

The electrospinning enclosure 300 is an enclosed housing to contain the electrospinning process and minimize the release of potential harmful substances to the working environment. The electrospinning enclosure 300 except for minimally sized apertures that allow the plurality of continuous electrode wires 1000 to pass through the electrospinning enclosure 300 and narrow apertures that allow the substrate 120 (and polymer fiber web 110 formed thereon) to pass into and out of the electrospinning enclosure 300 is substantially enclosed and operated below atmospheric pressure. Vapors that are generated in the electrospinning process are contained inside the electrospinning enclosure 300 and subsequently collected in a vapor collection and solvent recovery system 1600 as described in further detail herein. In some aspects the electrospinning enclosure 300 is operated at a negative pressure relative to atmospheric pressure so that atmosphere/air proximate the electrospinning enclosure 300 is drawn into the electrospinning enclosure 300 and collected by the vapor collection and solvent recovery system 1600, which prevents potentially harmful vapors in the electrospinning enclosure 300 from escaping to the atmosphere. The plurality of continuous electrode wires 1000 are driven into and then out of the electrospinning enclosure 300 through apertures whose diameter is slightly larger than the diameter of the electrode wire used and, as further described herein, are coated with a layer of liquid polymer which provides the polymer source for the fibers in the electrospun polymer fiber web 110.

The electrospinning enclosure 300 includes at least one liquid polymer coating device 400. The at least one liquid polymer coating device 400 provides the liquid polymer source to coat the plurality of continuous electrode wires 1000. In exemplary aspects the at least one liquid polymer coating device 400 includes a liquid polymer coating manifold 410 and a liquid polymer overflow reservoir 420.

The liquid polymer coating manifold 410 includes a plurality of wire inlet apertures 430 and a plurality of wire outlet apertures 440 corresponding to the number of wire inlet apertures 430. The wire inlet apertures 430 and wire outlet apertures may in some aspects have a portion that extend distally from the outside surface of the liquid polymer coating manifold 410 for some length "L", or they may have a zero length L, in which case the thickness of the apertures corresponds to the thickness of the liquid polymer coating manifold. The diameter and length of the apertures may vary depending on the level of liquid polymer overflow to be controlled. Liquid polymer is provided to the liquid polymer coating manifold 410 by a liquid polymer recycle and feed system 1200 through a liquid polymer supply port 450. The liquid polymer recycle and feed system 1200 is described in further detail below. In some aspects of operation, which is explained more fully herein, each of the plurality of continuous electrode wires 1000 is driven, in a continuous loop, into the at least one liquid polymer coating device 400, through a wire inlet aperture 430, and into the liquid polymer coating manifold 410 where it is coated with a layer of liquid polymer. Each coated continuous wire 1000 then exits the liquid polymer coating manifold 410 through the wire outlet aperture 440 corresponding to its wire inlet aperture 430 (with which it is aligned) and exits the liquid polymer coating device 400.

The liquid polymer overflow reservoir 420 receives liquid polymer overflow from the liquid polymer coating manifold 410 and any liquid polymer that drips from the plurality of continuous electrode wires 1000 exiting the liquid polymer coating manifold 410. As the liquid polymer overflow reservoir 420 fills, a liquid polymer recirculation port 455 recirculates the liquid polymer collected in the reservoir to the liquid polymer recycle and feed system 1200. In some aspects the liquid polymer recirculation port 455 recirculates liquid polymer to the liquid polymer recycle and feed system 1200 by gravity flow.

The liquid polymer described herein may be any polymer suitable for use in electrospinning applications, and includes naturally occurring and synthetic polymers in either a pure melt liquid state or a liquid solution formed by dissolving the polymer into a pure solvent or a solvent mixture. Moreover, the liquid polymer could include one or more polymers mixed together. Exemplary naturally occurring polymers suitable for use in aspects of the disclosure include, but are not limited to, proteins, celluloses, lignin, collagen, DNA, and rubber. Exemplary synthetic polymers suitable for use in aspects of the disclosure include, but are not limited to, polyamide, polyurethane, polybenzimidazole, polycarbonate, polyacrylonitrile, polyvinyl alcohol, polylactic acid, polyethylene-co-vinyl acetate, polymethacrylate, polyethylene oxide, polyaniline, polystyrene, polyvinylphenol, polyvinylchloride, polyetherimide, polyaramid, and synthetic rubber. In some aspects one or more different kinds of polymer sources may be formed into a single polymer fiber web 110 with different fiber layers. For example, in a system including a plurality of liquid polymer coating devices 400, each of the liquid polymer coating devices 400 may be supplied with a different source of liquid polymer so that the polymer fiber web 110 would thus include multiple polymers having multiple layers on the substrate 120.

The wire drive system 600 moves the plurality of continuous electrode wires 1000 through the electrospinning enclosure 300. In certain aspects the wire drive system includes a master wire drive drum 610 and a slave wire drive drum 620 that pulls the plurality of continuous electrode wires 1000. The driving force of the master wire drive drum 610 is directly coming from a power supply unit, such as variable frequency drive (VFD) while the driving force of the slave wire drive drum 620 is coming from the master wire drive drum 610. One particular advantage of a master and slave wire drive drum arrangement is a substantial increase in the amount of pulling force that can be passed to each of the continuous electrode wires without slipping or skidding between the wires and the drums.

The master wire drive drum 610 includes a master gear plate 630 and the slave wire drive drum 620 includes a slave gear plate 640 coupled to the master gear plate 630 so that when the master wire drive drum 610 rotates the slave wire drive drum 620 rotates in the opposite direction. The master wire drive drum 610 is coupled to a motor-driven shaft 650 that rotates the master wire drive drum 610. In some aspects a variable speed motor drives the master wire drive drum 610. The speed of the master wire drive drum 610 may be varied in some aspects to drive the plurality of continuous electrode wires 1000 at a speed of from about 1 meter per minute (m/min) to about 200 m/min. In certain aspects a fixed speed motor could drive the master wire drive drum 610.

The slave wire drive drum 620 is coupled to a free-rotating shaft 660 that allows it to rotate freely in response to rotation of the master wire drive drum 610. In another aspect the slave wire drive drum 620 may be driven by the master wire drive drum 610 by a chain rather than by coupled gear plates (630, 640) such as those described herein.

Figure 5:
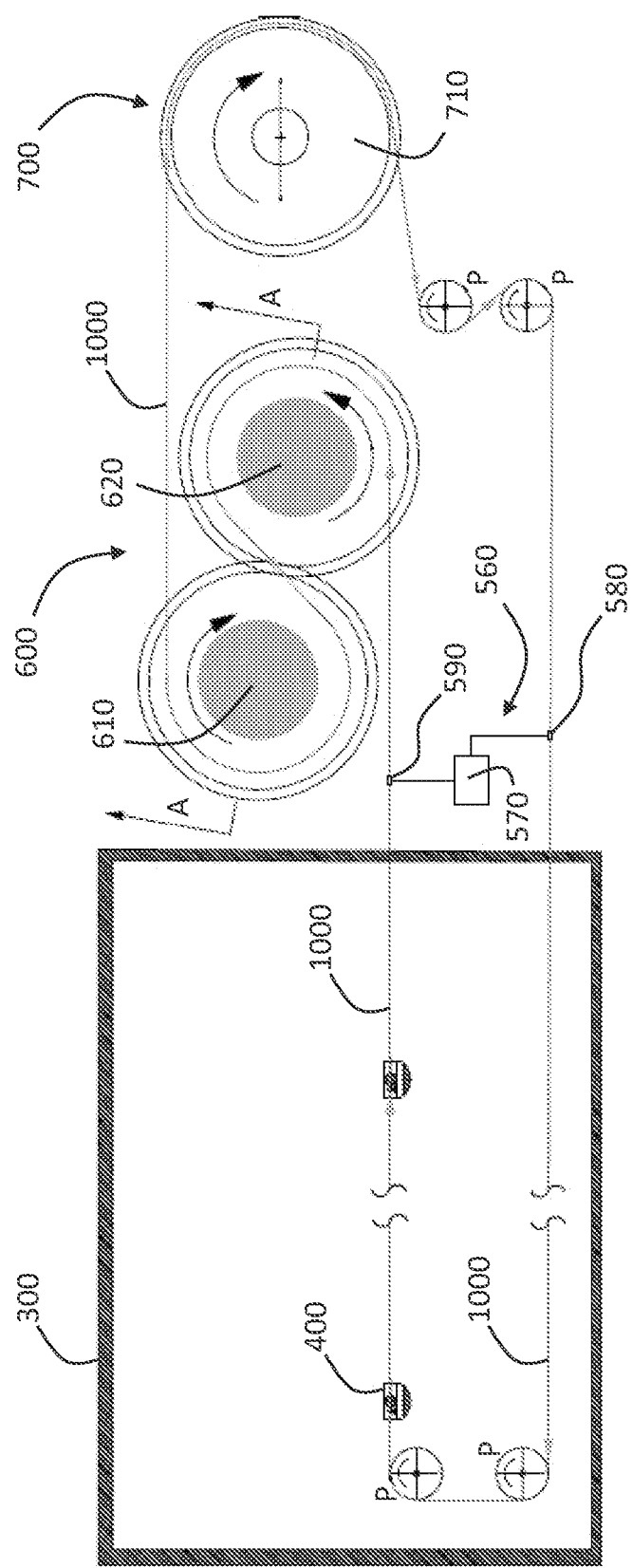
FIG. 5 is a side view of a simplified diagram showing the travel path for the plurality of continuous electrode wires including the electrospinning enclosure, wire drive system and wire tensioning system.
Figure 7:
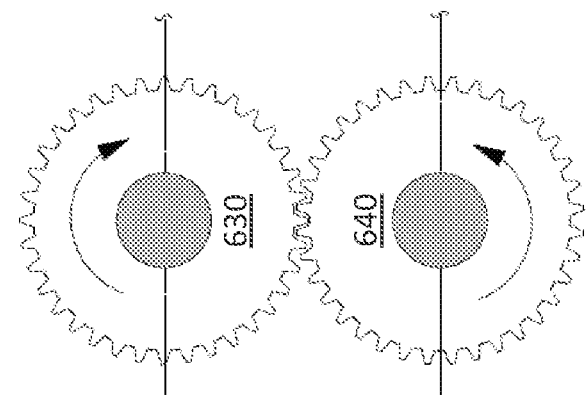
FIG. 7 is a detail in section taken on the line B-B of FIG. 6.
Figure 6:
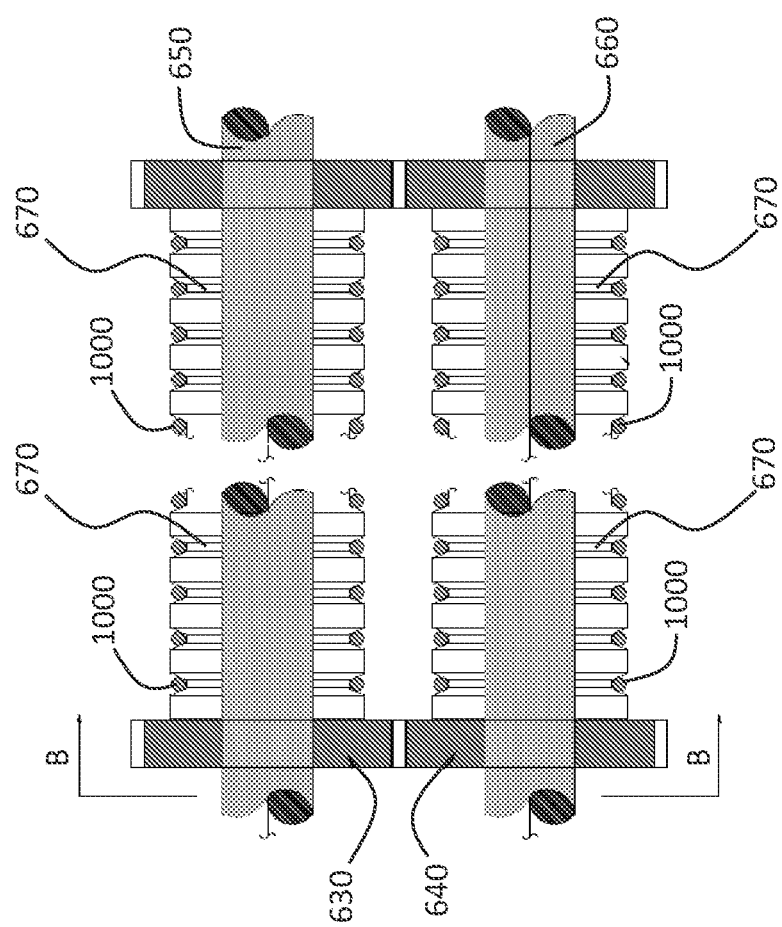
FIG. 6 is a detail in section taken on the line A-A of FIG. 5.

As illustrated in FIG. 6, each of the master wire drive drum and slave wire drive drum include a plurality of wire guides 670 to separate the plurality of continuous electrode wires 1000. Each of the plurality of wire guides includes a channel or groove to guide one of the plurality of electrode wires 1000. As shown in FIG. 5 (for only one wire), the continuous electrode wire 1000 is pulled by the master wire drive drum 610 and the slave wire drive drum 620. The continuous electrode wire 1000 may be guided by a wire guide 670 on each of these wire drums. From the slave wire drive drum 620, the continuous electrode wire may be looped through the wire tensioning system 700.

The wire tensioning system 700 provides a requisite amount of tension to the plurality of continuous electrode wires 1000. In certain aspects the wire tensioning system independently tensions each of the plurality of continuous electrode wires 1000. This could be accomplished by having each of the continuous electrode wires 1000 guided by an independent wire tensioner 710 that provides independent tension to the continuous electrode wire. FIG. 5 provides an example for one wire and shows one wire tensioner 710; it would be recognized that in some aspects each continuous electrode wire 1000 would have its own wire tensioner 710. Thus, an apparatus including 250 wires would include 250 individual tensioners. In certain aspects, the individual tensioners may be separated into groups that are installed in different locations to address issues relating to installation space limitations. For example, it could be difficult to install the exemplary 250 individual tensioners in a single row where it is desirable to space the continuous electrode wires a short distance apart from one another (e.g., 5 millimeters (mm) apart, or 10 mm apart, or 15 mm apart, or 20 mm apart). Thus, in one aspect the continuous electrode wires may be separated into 5 groups: with Group 1 including the tensioners for wires 1, 6, 11, 16, . . . and 246; Group 2 including the tensioners for wires 2, 7, 12, 17, . . . and 247; Group 3 including the tensioners for wires 3, 8, 13, 18, . . . and 248; Group 4 including the tensioners for wires 4, 9, 14, 19, . . . and 249; and Group 5 including the tensioners for wires 5, 10, 15, 20, . . . and 250. In this manner, the available distance between tensioners for each wire increases to 25 mm.

The plurality of continuous electrode wires 1000 may be any suitable wire type, including but not limited to braided, twisted, piano and drawn. It may be desirable to select a wire that provides a relatively high surface area so that more liquid polymer can coat the surface of the wire and be available for electrospinning, although a higher surface wire could provide more surfaces for retention of residual unreacted polymer, which could present a contamination/cleaning concern.

The apparatus 100 and associated components described herein including but not limited to the wire drive system 600; wire tensioning system 700 with individual wire tensioners 710; and electrospinning enclosure 300 containing at least one liquid polymer coating device 400 including a liquid polymer coating manifold 410 having a plurality of wire inlet apertures 430 and corresponding wire outlet apertures 440 allows dozens or even hundreds of continuous electrode wires 1000 to be driven through the electrospinning enclosure 300 where they can be coated with liquid polymer and be used in an electrospinning process. Moreover, these plurality of (dozens/hundreds of) continuous electrode wires 1000 are continuously cycling through the electrospinning enclosure 300 in an endless loop, so the electrospinning process for forming the polymer fiber web 110 can be carried out at a much greater capacity (several orders of magnitude greater) than currently known electrospinning processes.

Figure 10:
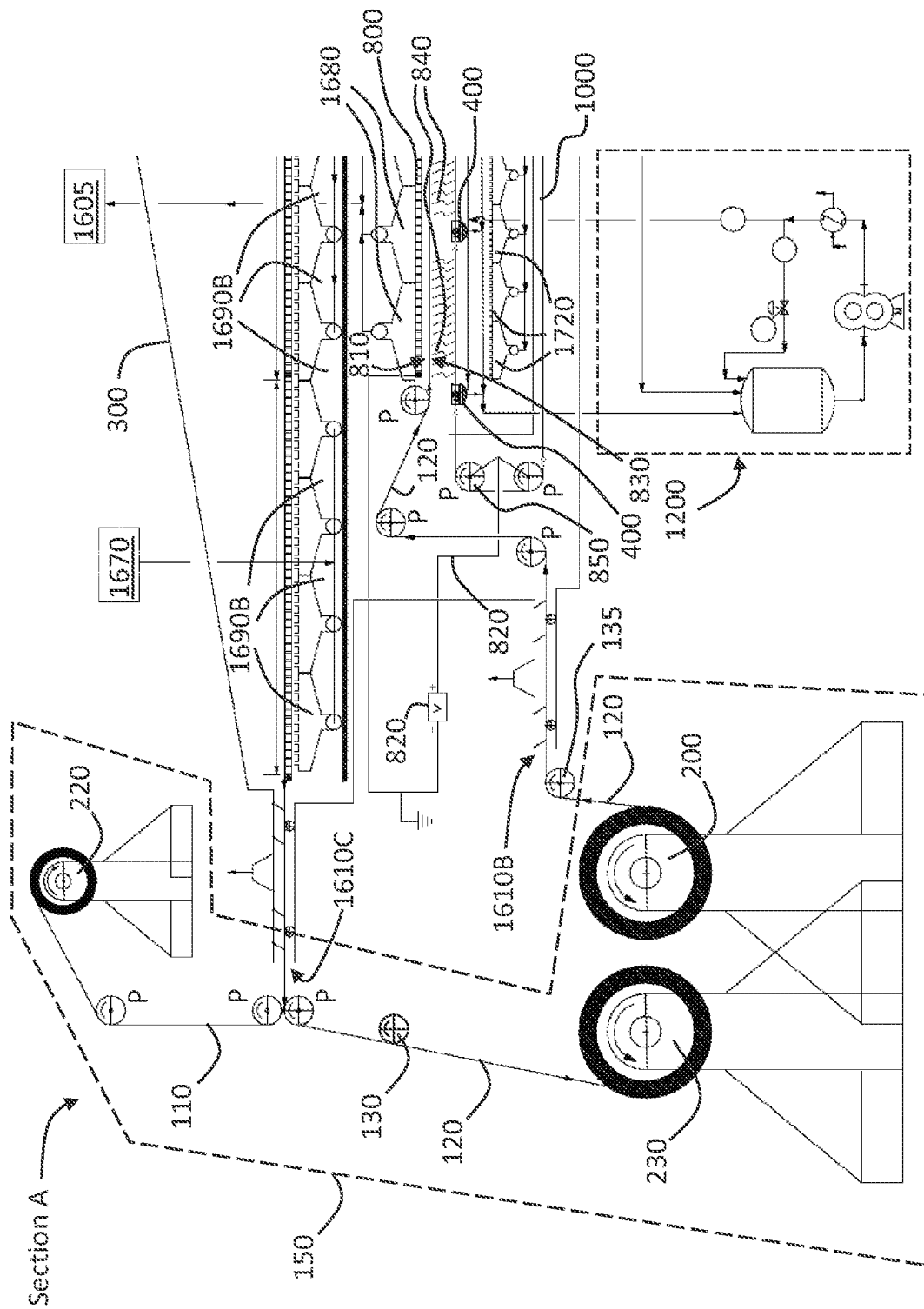
FIG. 10 is a partial schematic diagram of an electrospinning apparatus showing Section A of FIG. 9.

The apparatus includes at least one high voltage power supply unit 820 that provides the requisite electric field strength for the electrospinning process. Each of the at least one high voltage power supply units 820 has a negative voltage source and a positive voltage source. In general, the negative voltage source is wired and connected to an electrically conductive ground plate 800 located inside the electrospinning enclosure 300 and proximate a first side 810 of the substrate 120 while the positive voltage source is wired and connected to at least one electrically conductive freely rotating axle 850 in contact with the plurality of continuous electrode wires 1000, which as shown in FIGS. 1 and 10 are located proximate a second side 830 of the substrate 120. In some aspects the at least one electrically conductive freely rotating axle 850 includes a plurality of grooves (e.g., V-shaped grooves) evenly distributed on its surface. Each of the grooves receives one of the continuous electrode wires 1000. Good contact between the groove and electrode wire is maintained by adjusting the corresponding wire tensioner 710 so that the positive electric voltage from the at least one high voltage power supply unit 820 is passed on to each of the electrode wires 1000. During operation, the electrically conductive freely rotating axle 850 rotates freely as the electrode wires 1000 move. In some aspects, the positive and negative sources of the at least one high voltage power supply unit 820 may be switched between the electrically conductive ground plate 800 and the continuous electrode wires 1000. In such aspects a negative voltage electrospinning process is contemplated.

The at least one high voltage power supply unit 820, shown in FIG. 1 as external to the electrospinning enclosure 300, applies a voltage difference between the electrically conductive ground plate 800 and the plurality of continuous electrode wires 1000. During operation, the positive voltage applied to the liquid polymer-coated continuous electrode wires 1000 passing across the electrically conductive ground plate 800 in the electrospinning zone Z of the electrospinning enclosure 300 resulted in an electric field that causes the liquid polymer on the continuous electrode wire 1000 to become charged, resulting in charged liquid Taylor Cone jets 840 erupting from the surface of the continuous electrode wires 1000 towards the negative voltage source of the conductive ground plate 800. The liquid Taylor Cone jets 840 elongate and partially dry in flight, forming a polymer fiber having a nanometer-scale or submicron scale diameter. The fibers contact the substrate 120 and are collected thereon, which is also moving through the electrospinning enclosure 300 generally parallel to and in either the same or opposite direction as the plurality of continuous electrode wires 1000. As this process is repeated through the length of the conductive ground plate 800, which may be referred to as an electrospinning zone Z, a polymer fiber web 110 is formed on the substrate 120. While the polymer fiber is described herein as having a nanometer-scale diameter or submicron scale diameter and these fibers are commonly referred to as nanofibers or submicron fibers, it will be recognized that the fibers produced by the apparatus and methods described herein need not be nanofiber-sized or submicron-sized and that the process conditions may be modified so as to form fibers having other sizes.

While the at least one high voltage power supply unit 820 is shown in FIG. 1 as external to the electrospinning enclosure 300, it need not be. It could be located within the electrospinning enclosure 300 if desired.

Figure 3:
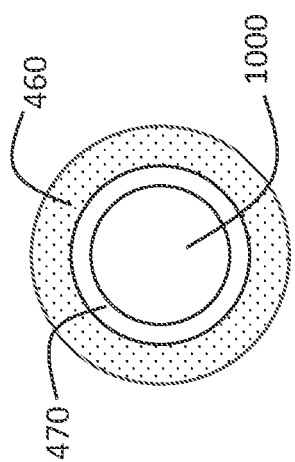
FIG. 3 is a detail in section taken on the line A-A of FIG. 2.

With specific reference to FIG. 3, in certain aspects one or more of the wire inlet apertures 430 and wire outlet apertures 440 include a capillary tube 460 disposed between the wire inlet aperture 430/wire outlet aperture 440 and its respective continuous electrode wire 1000. As illustrated, the capillary tube 460 may extend outward from the liquid polymer coating manifold 410 for a length L, and may be sized so that it has an inner diameter that is slightly larger than the diameter of the continuous electrode wire 1000 passing therethrough, resulting in a small gap 470. The inner diameter of the capillary tube 460 is sized so as to be large enough to allow the continuous electrode wire 1000 to pass through the liquid polymer coating manifold 410 with a minimum amount of friction but small enough to prevent excessive loss of liquid polymer from the liquid polymer coating manifold 410. Further, the length L of the capillary tube provides liquid backpressure in the liquid polymer coating manifold so as to further minimize loss of liquid polymer from the capillary tube(s) 460. Liquid polymer that exits the capillary tube 460 (and its respective wire inlet aperture/wire outlet aperture) drains to the liquid polymer overflow reservoir 420 as described herein.

In some aspects the liquid polymer coating device 400 may further include a liquid polymer overflow port 480. The liquid polymer overflow port 480 may provide a further source for liquid polymer to overflow into the liquid polymer overflow reservoir 420 as described herein. In some aspects the liquid polymer overflow port 480 may be configured to provide a constant overflow amount to ensure that the liquid polymer in the liquid polymer coating device 400 is continuously moving and has a relatively constant temperature.

Figure 2:
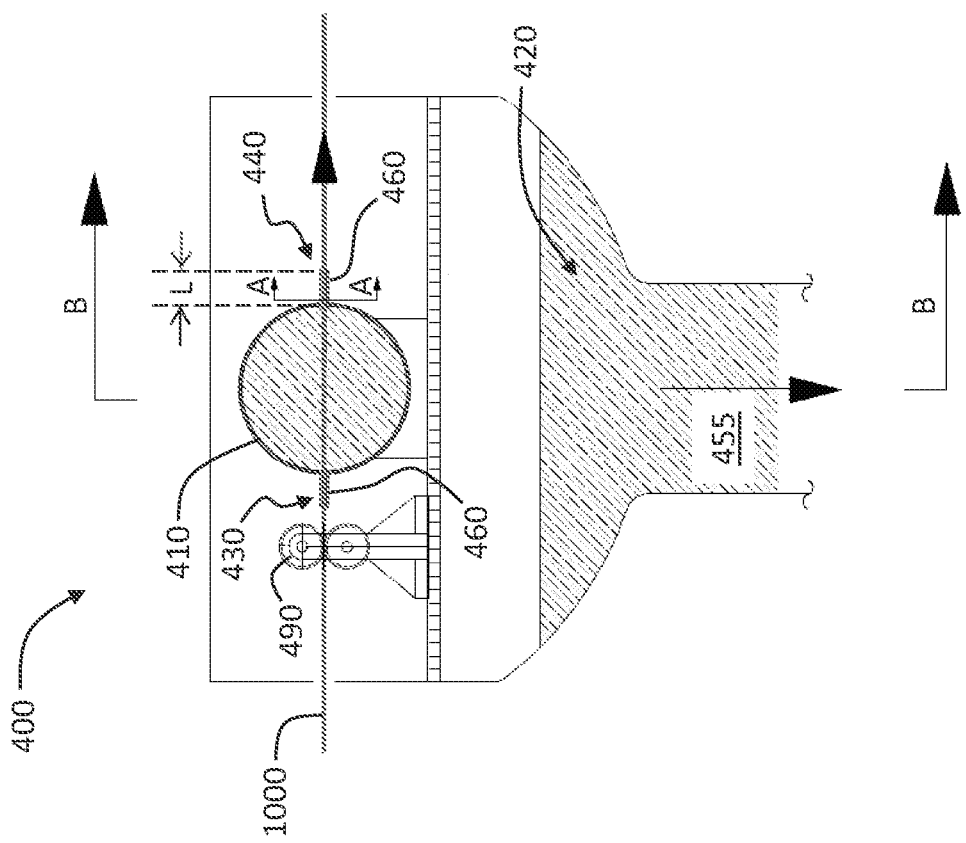
FIG. 2 is a side view of a liquid polymer coating device for applying a layer of liquid polymer onto a plurality of continuous electrode wires according to an aspect of the disclosure.

In certain aspects the liquid polymer coating device 400 may include at least one set of wire positioning pulleys 490. The at least one set of wire positioning pulleys 490 may be located proximate the plurality of wire inlet apertures 430 as shown in FIG. 2, and may function to guide the plurality of continuous electrode wires 1000 into the plurality of wire inlet apertures 430 of the liquid polymer coating manifold 410.

The apparatus 100 may in certain aspects include a wire cleaning assembly 500. The wire cleaning assembly 500 may be included to remove residual liquid polymer or other electrospinning residues from the surface of the plurality of continuous electrode wires 1000. The wire cleaning assembly 500 may include, but does not have to include, similar features as the liquid polymer coating device 400 described herein. An exemplary wire cleaning assembly 500 is illustrated in FIG. 4B and includes a solvent coating manifold 510 that includes a number of solvent manifold wire inlet apertures 530 and solvent manifold wire outlet apertures 540 corresponding to the number of continuous electrode wires 1000. The solvent coating manifold 510 may also include a solvent overflow reservoir 520 that receives overflow solvent from the solvent manifold wire inlet apertures 530 and solvent manifold wire outlet apertures 540. Fresh solvent may be provided to the wire cleaning assembly 500, and if included the solvent coating manifold 510, by way of a solvent coating port 550 associated with a solvent supply stream 1420. Excess solvent collected in the solvent overflow reservoir 520 may be returned to a solvent storage and supply system 1400 by way of a solvent recirculation port 555 associated with a solvent recirculation stream 1430. The solvent coating manifold 510 may thus operate in the same manner as the liquid polymer coating manifold 410 but provides a solvent solution to the plurality of continuous electrode wires 1000 to remove residual liquid polymer or other electrospinning residue from the continuous electrode wires 1000. The solvent can be either the same kind used to prepare the liquid polymer (e.g., the polymer solution) or any other suitable solvent. In some aspects the solvent recirculation port 555 recirculates solvent to the solvent storage and supply system 1400 by gravity flow.

The wire cleaning assembly 500 may be located within the electrospinning enclosure 300 as shown in FIG. 5 or outside the electrospinning enclosure 300 (not shown), although it will be recognized that in either case the wire cleaning assembly 500 will typically be located after, or downstream of, the electrospinning zone Z. As used herein, "upstream" and its counterpart term "downstream" relate to the location of one component relative to another with respect to the direction of travel of the plurality of continuous electrode wires 1000 during operation of the apparatus. In some aspects, as the continuous electrode wires 1000 exit the wire cleaning assembly 500 and before they exit the electrospinning enclosure 300, any retained solvent on the surface of the wires may be evaporated in a solvent drying step, which prevents the continuous electrode wires 1000 from carrying potentially harmful solvent to the environment.

In some aspects the apparatus 100 further includes an electric conductive resistance measuring system 560. The resistance measuring system includes a device such as an ohm meter 570 configured to measure resistance of one or more of the plurality of continuous electrode wires 1000 at both an upstream contact point 580 (i.e., prior to liquid polymer coating) and at a downstream contact point 590 (i.e., following the electrospinning zone Z and/or the wire cleaning assembly 500). A measured resistance may indicate that one or more of the plurality of continuous electrode wires 1000 exiting the electrospinning enclosure 300 may contain solid polymer on their corresponding surfaces and may need further cleaning through a harsher cleaning method such as with a wire scrubber 1900 or other cleaning system. In particular aspects the resistance measuring system is configured to measure each of the plurality of continuous electrode wires 1000 at the upstream contact point 580 and at the downstream contact point 590 over a particular time interval (e.g., every 5 milliseconds (ms)).

Figure 8:
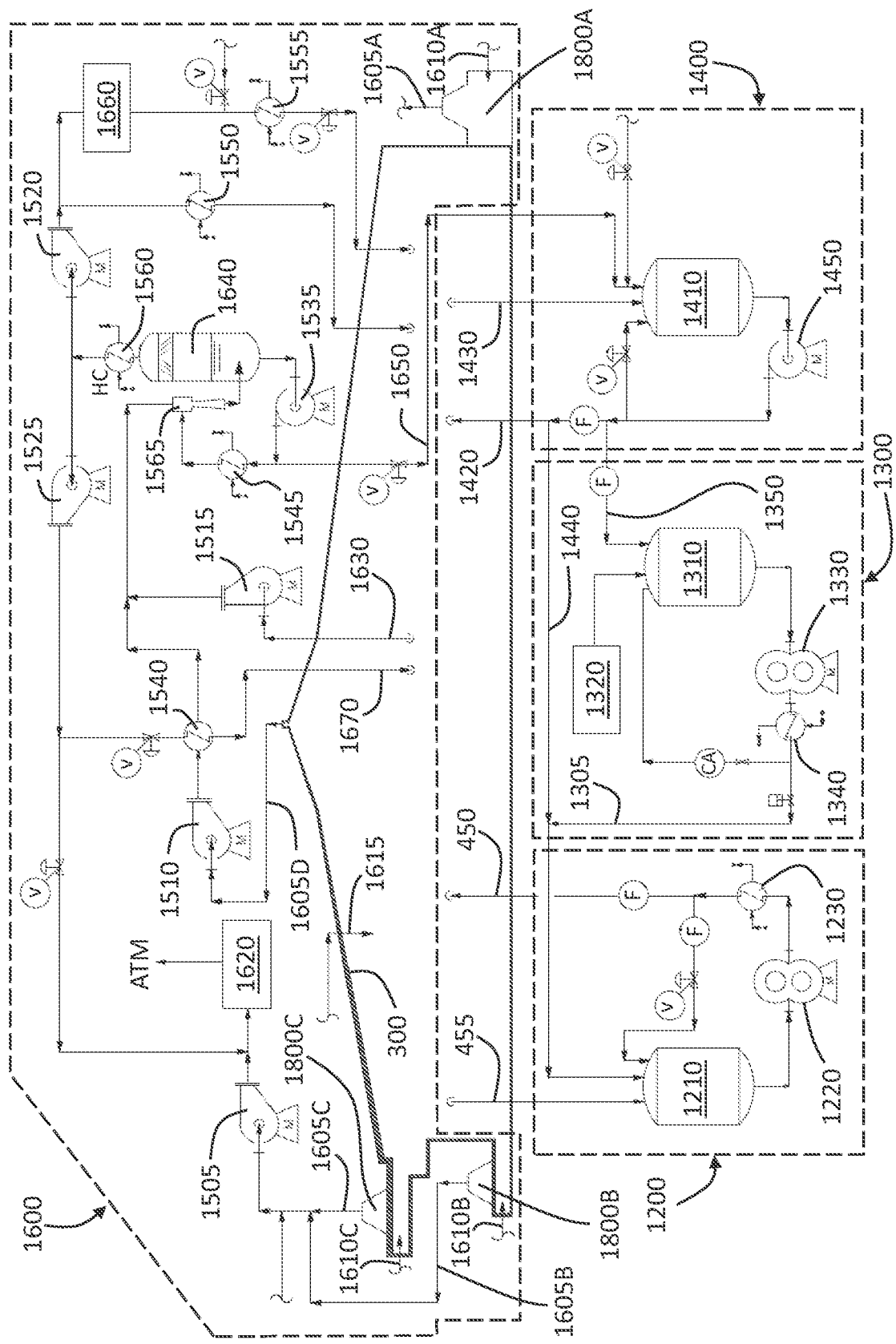
FIG. 8 is a schematic diagram showing auxiliary systems of an electrospinning apparatus according to aspects of the disclosure.

With reference to FIG. 8 and as explained above, the apparatus may include a liquid polymer recycle and feed system 1200. The liquid polymer recycle and feed system 1200 provides liquid polymer to each of the at least one liquid polymer coating devices 400 by way of the liquid polymer supply port 450 of the liquid polymer coating manifold 410 provided in each of the liquid polymer coating devices 400. In addition, the liquid polymer recycle and feed system 1200 receives liquid polymer overflow received from each of the at least one liquid polymer coating devices 400 by way of the liquid polymer recirculation port 455 provided therein. The liquid polymer recycle and feed system 1200 includes a recycle and feed tank 1210 for receiving recycled liquid polymer from each of the at least one liquid polymer coating devices 400 and delivering liquid polymer feed thereto, a liquid polymer circulation and supply pump 1220 that pumps liquid polymer to each of the at least one liquid polymer coating devices 400 (through, e.g., a liquid polymer distribution manifold (not illustrated)), and a liquid polymer heat exchanger 1230 that operates to maintain a desired liquid polymer temperature. It should be noted that the schematic diagram in FIG. 8 illustrates various pumps ("M"), flow meters ("F"), valves ("V"), composition analyzers/transmitters ("CA") and heat exchangers/coolers ("HC"), the proper selection and operation of which is known to those in the art and not specifically described herein.

The liquid polymer recycle and feed system 1200 receives liquid polymer from a liquid polymer preparation system 1300 by way of a liquid polymer charging stream 1305. The liquid polymer recycle and feed system 1200 operates to provide the liquid polymer used for the electrospinning process at the requisite concentration and temperature. The liquid polymer preparation system 1300 includes a liquid polymer preparation tank 1310 which in some aspects includes an agitator and a polymer storage and charging unit 1320. In some aspects the liquid polymer preparation system 1300 operates in a batch process and includes steps of: (a) receiving into the liquid polymer preparation tank 1310 a pre-determined amount of solvent from the solvent storage and supply system 1400 by way of a solvent charging stream 1350; (b) receiving into the liquid polymer preparation tank 1310 a pre-determined amount of polymer from the polymer storage and charging unit 1320; (c) mixing and heating the solvent and polymer in the liquid polymer preparation tank to a pre-determined temperature until the solid polymer dissolves completely in the solvent; and (d) transferring the prepared polymer solution batch to the recycle and feed tank 1210. In some aspects the liquid polymer preparation tank may include agitation and heating features to facilitate preparation of the liquid polymer. As shown in FIG. 8, the liquid polymer preparation system may also include in certain aspects a liquid polymer preparation transfer pump 1330 that circulates the liquid polymer in the liquid polymer preparation tank 1310 through a polymer preparation heat exchanger 1340 and, at the completion of the batch, transfer the liquid polymer from the polymer preparation tank 1310 to the recycle and feed tank 1210 by way of the liquid polymer charging stream 1305.

In certain aspects the apparatus 100 may also include a solvent storage and supply system 1400. The solvent storage and supply system 1400 operates to store and supply solvent to the liquid polymer preparation system 1300 and to the wire cleaning assembly 500. In some aspects the primary source of solvent for the solvent storage and supply system is the solvent recovered in the vapor collection and solvent recovery system 1600, as explained in further detail below. In such aspects fresh make-up solvent could be added from another source (not illustrated) to balance any solvent lost during operation of the wire cleaning assembly 500 and other solvent handling. The solvent storage and supply system 1400 includes a solvent storage tank 1410. Solvent from the solvent storage tank 1410 is provided to the wire cleaning assembly 500 by way of a solvent supply stream 1420 and receives overflow solvent from the wire cleaning assembly by way of a solvent recirculation stream 1430. In addition, solvent could be provided to the liquid polymer recycle and feed system 1200 by way of a liquid polymer dilution stream 1440 if it is necessary to dilute the concentration of the liquid polymer in the liquid polymer recycle and feed system 1200. A solvent supply pump 1450 pumps the solvent to the wire cleaning assembly 500, the liquid polymer recycle and feed system 1200 and the liquid polymer preparation system 1300.

In further aspects the apparatus 100 includes a vapor collection and solvent recovery system 1600, which in some aspects includes several subsystems whose operation and functions are described in further detail below.

In some aspects the vapor collection and solvent recovery system 1600 provides a requisite level of vacuum to the electrospinning enclosure 300 so that atmosphere/air proximate the electrospinning enclosure 300 is drawn into the electrospinning enclosure 300, which prevents potentially harmful vapors in the electrospinning enclosure 300 from escaping to the environment. In certain aspects, and as shown in FIG. 8, the vapor collection and solvent recovery system includes five blowers (blower #1 1505, blower #2 1510, blower #3 1515, blower #4 1520 and blower #5 1525) for drawing vapor and gas from the electrospinning enclosure 300 into the vapor collection and solvent recovery system 1600. Blower #1 1505 draws ambient air into the electrospinning enclosure 300 at various entry points (ambient air entry points #1 1610A, #2 1610B and #3 1610C), including openings where the plurality of continuous electrode wires 1000 enter and exit the electrospinning enclosure 300 (emission control box 1800A), where the substrate 120 enters the electrospinning enclosure 300 (emission control box 1800B) and where the substrate 120 exits the electrospinning enclosure 300 (emission control box 1800C). Ambient air and some polymer and solvent (via emission control box exhaust streams 1605A, 1605B, and 1605C) are drawn through blower #1 1505, collected and ultimately disposed of in an incinerator 1620 to remove harmful residual vapors. The emission control box exhaust streams may in some aspects be attached or coupled to the emission control box by known mechanical attachment methods. In some aspects blower #1 1505 operates emission control boxes 1800A, 1800B and 1800C at a vacuum of about −2" water column gauge (WCG) to about −10" WCG.

The output of the incinerator 1620 may be vented to the atmosphere. In certain aspects blower #3 1515 collects solvent vapor generated and draft gas (if used) by way of the solvent vapor stream 1630 which has a relatively low temperature and is rich in solvent vapor. Blower #2 1510, on the other hand, collects the vapor generated from fiber drying and hot drying gas utilized for the fiber drying by the way of the hot gas exhaust stream 1605D which has relatively high temperature and low vapor concentration. The vapor/gas from blower #2 1510 passes heat exchanger #1 1540 to exchange the heat with the vent gas stream from the solvent condenser 1640 by way of blower #5 1525. After heat exchanger #1, the stream from the outlet of blower #2 1510 (having a decreased temperature) merges with the solvent vapor stream 1630 from the outlet of blower #3 1515. This combined vapor/gas stream enters a venturi mixer 1565 and the solvent condenser 1640. The venturi mixer 1565 mixes the vapor/gas stream and a cold liquid circulation stream from pump #1 1535 so that the vapor/gas temperature is further cooled to approximately the operating temperature of the solvent liquid inside the solvent condenser 1640. As a result, most of the solvent vapor in the vapor/gas stream is condensed into a liquid. The heat released by the condensation of the vapor is absorbed by the cold solvent liquid circulation stream entering the venturi mixer and subsequently such heat is removed by heat exchanger #2 1545 using a cooling medium, such as but not limited to cooling water and chilled water. Any solvent vapor not condensed through the operation of venturi mixer 1565 will be further condensed when the vent gas out of solvent condenser 1640 passes through heat exchanger #5 1560. Recovered liquid solvent inside the solvent condenser 1640 is returned to the solvent storage and supply system 1400 by way of a solvent condensate stream 1650. In some aspects the rate of return may be controlled by the liquid level inside the solvent condenser 1640.

After heat exchanger #5 1560, the vent gas has a lower vapor content in the gas. The vent gas stream may be split into two separate streams, one to blower #5 1525 and another to blower #4 1520. The vent gas out of blower #5 1525 is further split into two streams, one to incinerator 1620 and another to heat exchanger #1 1540. The flow rate of the vent stream to the incinerator 1620 may be controlled based on the required gas purge amount, which may be calculated based on the deviation of the measured oxygen concentrations in the solvent vapor stream 1630 and hot gas supply stream 1670 from a pre-set value. In some aspects the pre-set value is nominally 20-30% of the oxygen concentration under which the solvent vapor has the potential to be ignited. As the deviation increases, more vent stream gas is purged to the incinerator 1620 and vice versa. The temperature of the other vent stream from blower #5 1525 increases after it passes through heat exchanger #2 1545. This heated vent gas is returned to the electrospinning enclosure 300 and reused as draft gas for the electrospinning process. The vent stream to blower #4 1520 is further split into two separate streams, one to heat exchanger #3 1550 and another to an adsorption bed 1660. The temperature of the vent stream out of heat exchanger #3 1550 is increased to a pre-set value that in some aspects is the temperature for the primary drying gas used for drying the fiber web inside the electrospinning enclosure 300.

Aspects of the apparatus 100 described herein provide at least an additional advantage over current electrospinning processes by allowing electrospinning of toxic or flammable polymers, as the electrospinning enclosure, which is operated below atmospheric pressure, prevents toxic and/or flammable vapors from escaping into the atmosphere/working environment. These vapors are collected and safely processed as discussed herein. More particularly, in some aspects the electrospinning enclosure 300 includes one or more oxygen sensors to measure and/or monitor the oxygen content in the enclosure. If the detected oxygen content is higher than a pre-set low value, more vent gas from blower #5 1525 is sent to the incinerator 1620 and fresh inert gas (such as but not limited to nitrogen) may be charged into the electrospinning enclosure 300 until the oxygen content inside the electrospinning enclosure 300 drops below the pre-set low value. In further aspects, if the detected oxygen content becomes higher than a pre-set high value, the high voltage power supply unit 820 could be automatically shut down as a safety feature. The safety feature could include, e.g., switching the contacts of the high voltage power supply unit 820 to a grounding system and/or charging a large quantity of fresh nitrogen into the electrospinning enclosure 300. In this manner, these features may regulate the oxygen concentration inside the electrospinning enclosure in a range from a pre-set-low value to a pre-set-high value, which in some aspects is approximately 30% of the oxygen concentration under which the gas/vapor mixture maybe ignite with an ignition source.

As shown in FIG. 8, the adsorption bed 1660 in some aspects is a carbon adsorption bed which removes residual solvent vapor from blower #4 1520 to a predetermined low level suitable for the secondary drying gas used for drying the fiber web inside the electrospinning enclosure 300. The required temperature of the secondary drying gas may be obtained by passing the gas stream from the adsorption bed 1660 through heat exchanger #4 1555. This heated gas, which has a very low solvent vapor content, is sent into the electrospinning enclosure 300 and is used as the source of drying gas. The electrospinning enclosure 300 may include one or more pressure sensors for monitoring the pressure therein. As discussed, the operating pressure in the electrospinning enclosure is maintained at a pressure lower than atmospheric pressure, which is controlled by sending the required amount of fresh make-up gas to the gas stream prior to the heat exchanger 1555. For example, if the measured pressure inside the electrospinning enclosure 300 is less than a pre-set value, then more fresh make-up gas will be charged into the system and vice versa. On the other hand, if the measured pressure inside the electrospinning enclosure 300 is higher than the pre-set value (even with zero fresh make-up gas flow) then the vent gas amount from blower #5 1525 to the incinerator 1620 may be correspondingly increased. In this manner, the operating pressure inside the electrospinning enclosure may be controlled in a range from a pre-set-low value to a pre-set high value.

Figure 9:
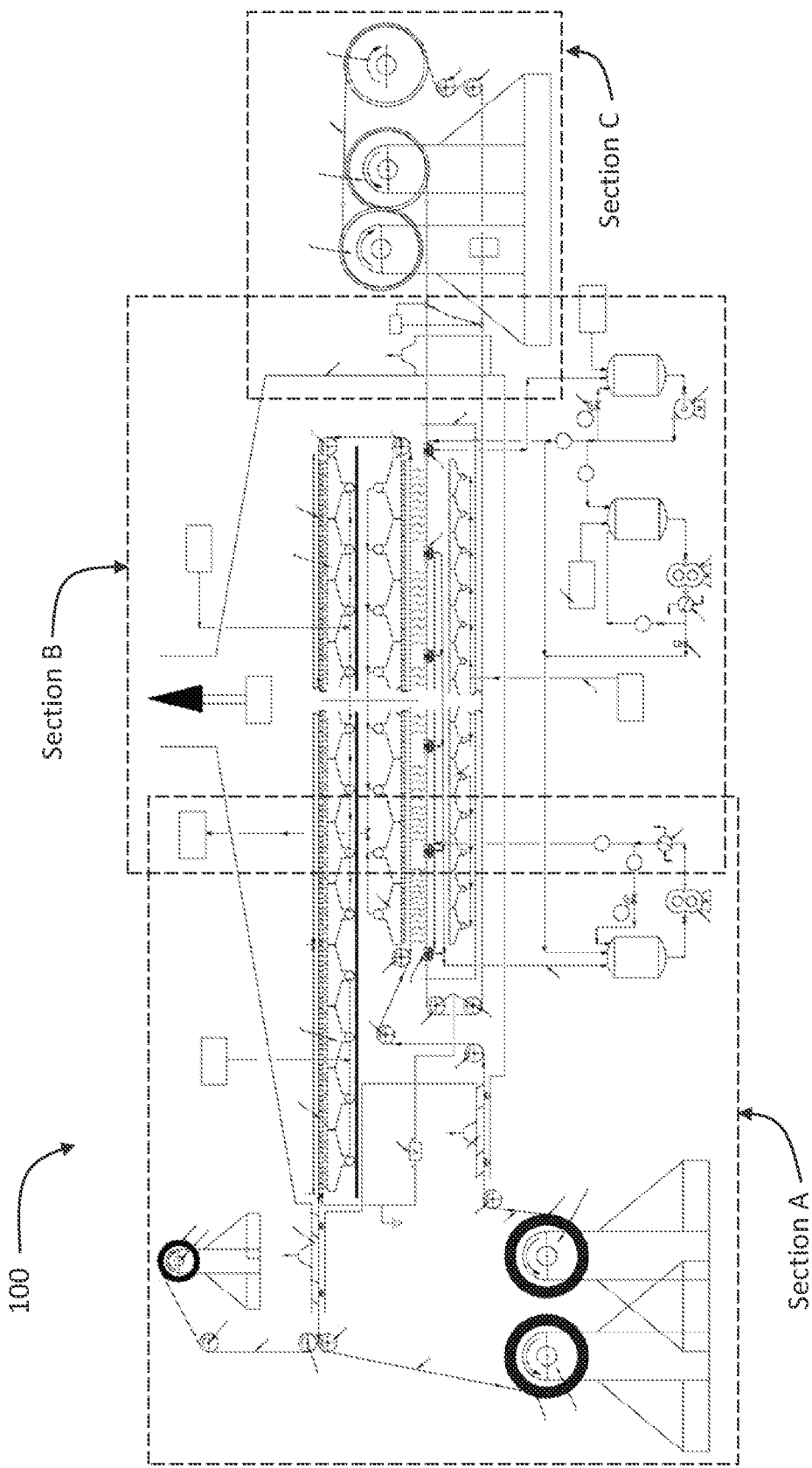
FIG. 9 is a detailed schematic diagram of an electrospinning apparatus according to an aspect of the disclosure.
Figure 11:
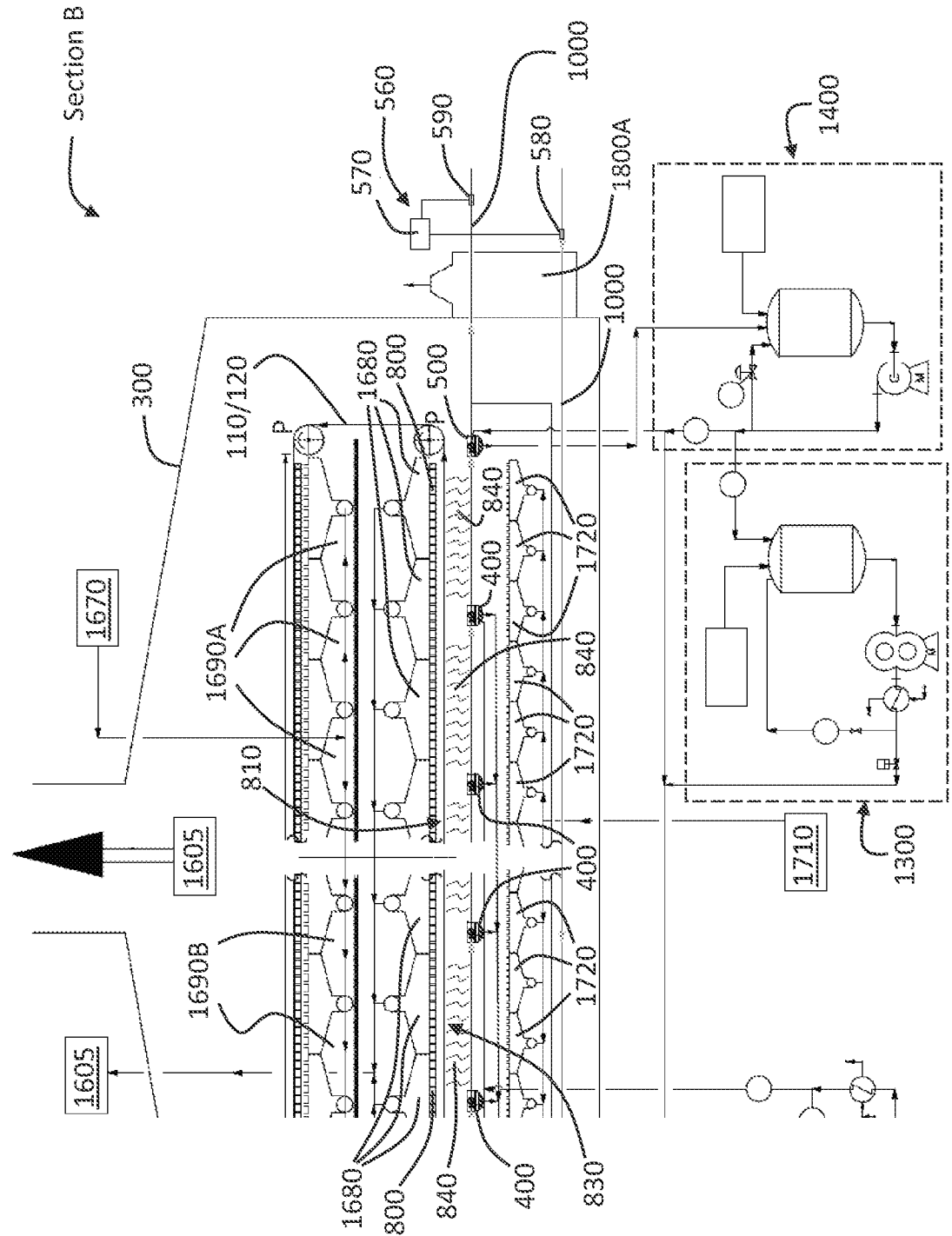
FIG. 11 is a partial schematic diagram of an electrospinning apparatus showing Section B of FIG. 9.
Figure 12:
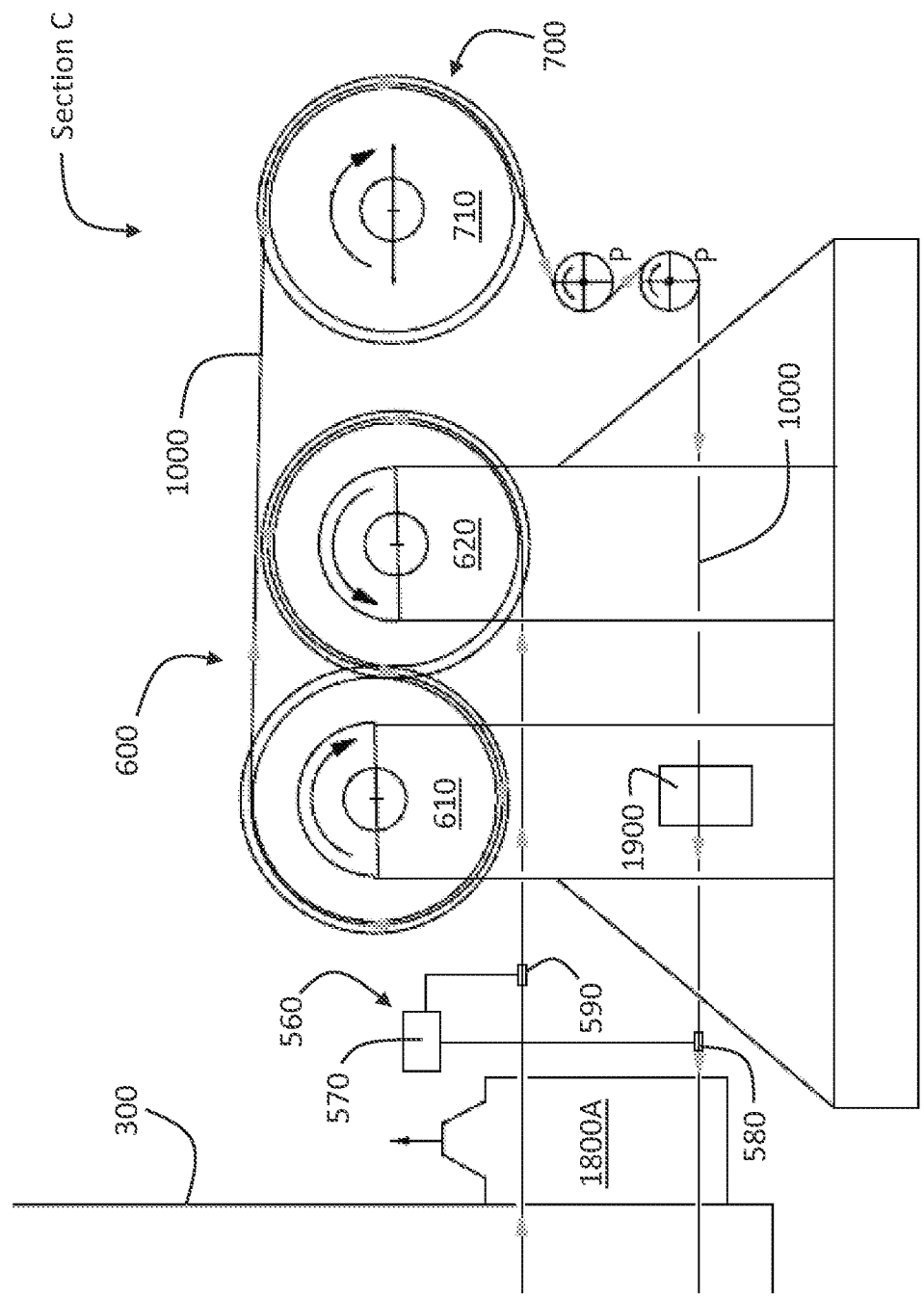
FIG. 12 is a partial schematic diagram of an electrospinning apparatus showing Section C of FIG. 9.

FIGS. 9-12 provide a detailed schematic diagram of the apparatus 100 that is more generally illustrated in FIG. 1. The overall apparatus is shown in FIG. 9, and is divided into three sections as shown. Section A is illustrated in FIG. 10, Section B is illustrated in FIG. 11, and Section C is illustrated in FIG. 12. In certain aspects, the apparatus 100 may include other features in addition to one or more of the components described above.

Draft gas may be blown onto the plurality of continuous electrode wires 1000 in the electrospinning enclosure 300 by way of a draft gas supply system including a draft gas source 1710 (shown on FIG. 11) which includes the hot gas supply stream 1670 shown in FIG. 8 and a draft gas distribution manifold 1720. The draft gas distribution manifold 1720 may distribute the draft gas to the plurality of continuous electrode wires 1000 through a series of vents, nozzles or other suitable openings. The draft gas supply system provides an upward force on the liquid Taylor Cone jets 840 erupting from the surface of the plurality of continuous electrode wires 1000 to help ensure that that the polymer fibers formed from the liquid Taylor Cone jets 840 reach the surface of the substrate 120. In some aspects one or both of the temperature (through heat exchanger #1 1540) and the flowrate (through the control valve above heat exchanger #1 1540) of the draft gas may be adjusted for desirable performance Draft gas may be removed by way of an exhaust manifold 1680 by blower #3 1515 (shown in FIG. 8) described herein.

The polymer fiber web 110 formed on the substrate 120 may not be completely dry when formed and may include residual solvent. In some aspects of the disclosure two drying steps, a primary drying step and a secondary drying step, may be used to dry the polymer fiber web 110. In each drying step hot gas is used as the drying medium. The hot gas exiting heat exchanger #3 1550 is used as the drying medium in the primary drying step (primary drying gas) while hot gas exiting heat exchanger #4 1555 is used as the drying medium in the secondary drying step (secondary drying gas). The secondary drying gas has a relatively lower solvent vapor content and higher temperature than the primary drying gas.

The primary drying gas enters a primary drying region through a primary distribution manifold 1690A (see FIG. 11) while the secondary drying gas enters the secondary drying region through a secondary distribution manifold 1690B (FIG. 10). Both the primary drying gas and secondary drying gas exit the electrospinning enclosure 300 through hot gas exhaust stream 1605D by blower #2 1510 as shown in FIG. 8. The primary and secondary distribution manifolds 1690A and 1690B may distribute the hot gases to the substrate 120/polymer fiber web 110 through a series of vents, nozzles or other suitable openings. In some aspects, the temperature and flow rate of the primary drying gas may be adjusted and controlled by heat exchanger #3 1550 and its associated control valve. In the same manner, the temperature and flow rate of the secondary drying gas may be adjusted and controlled by heat exchanger #4 1555 and its associated control valve.

As described herein, the apparatus 100 includes a substrate conveyor system 150 for moving the substrate through the electrospinning enclosure 300. In some aspects the substrate 120 and polymer fiber web 110 formed thereon may exit the electrospinning enclosure 300 and be collected by winding it onto a combination roller 210 (as shown in FIG. 1). In other aspects illustrated in FIG. 10, however, the polymer fiber web 110 may be stripped from the substrate 120 and wound onto a fiber web roller 220 and the substrate wound onto a separate substrate finishing roller 230. In further aspects (not illustrated), the substrate may be a continuous substrate, and as the polymer fiber web is removed from the substrate and wound onto a fiber web roller the substrate could be continuously cycled back into the apparatus 100 (in much the same manner that the plurality of continuous electrode wires 1000 are operated continuously).

The substrate 120 is preferably a porous/permeable material that is both lightweight and that will allow hot gases from the primary distribution manifold 1690A and secondary distribution manifold 1690B to pass therethrough and dry the polymer fiber web 110. It should, however, have sufficient strength to be transported through the apparatus 100/electrospinning enclosure 300 without tearing. Moreover, the substrate 120 may be any suitable material that can be wound onto the rollers described herein and that will receive the polymer fibers formed during the electrospinning process. The substrate 120 may include a substrate tensioner 130 that provides tension to the substrate 120 as it exits the electrospinning enclosure 300. A substrate re-direction roller 135 could be provided to alter the travelling direction of the substrate 120 as it is unrolled from the substrate supply roller 200.

In some aspects the apparatus 100 may include an emission control box 1800A through which the plurality of continuous electrode wires 1000 pass before entering and after exiting the electrospinning enclosure 300. The emission control box 1800A includes optimized gap spaces for the plurality of continuous electrode wires 1000 so as to minimize entry of atmosphere/air proximate the electrospinning enclosure 300 into the electrospinning enclosure 300 during operation of the apparatus 100.

In further aspects the apparatus 100 may include a wire scrubber 1900. The wire scrubber 1900 may be in contact with the plurality of continuous electrode wires 1000 at some suitable location such as a location proximate to where the plurality of continuous electrode wires 1000 enter the electrospinning enclosure (see FIG. 12) and may provide an additional mechanism to clean the surface of the plurality of continuous electrode wires 1000. In certain aspects the wire scrubber is located external to the electrospinning enclosure. In one aspect the wire scrubber is an abrasive material such as sandpaper. The wire scrubber 1900 physically contacts the plurality of continuous electrode wires 1000 and abrasively removes any deposited and/or coated polymer that remains on the wire surface, thereby enhancing the efficiency of the electrode wire. Other wire scrubbing materials, and other abrasive materials, are known and could be used in the wire scrubber 1900.

As shown in the figures, the apparatus 100 may include numerous pulleys P for maintaining and/or changing the direction of movement of one or more of the plurality of continuous electrode wires 1000, the substrate 120 and the polymer fiber web 110.

Aspects of the apparatus 100 described herein also provide substantial advantages over conventional electrospinning processes by allowing large-scale industrial production of hundreds of kg/hr or more using dozens or even hundreds of continuous electrode wires. In some aspects the apparatus could include over 25 continuous electrode wires, or over 50 continuous electrode wires, or over 100 continuous electrode wires, or over 150 continuous electrode wires, or over 200 continuous electrode wires, or over 300 continuous electrode wires, or over 400 continuous electrode wires, or even up to or over 500 continuous electrode wires. Moreover, the plurality of continuous electrode wires may have an extremely long length. Continuous electrode wire lengths of 5 meters (m) to even 50 m or more could be used in certain aspects of the disclosure, with continuous polymer fiber production rates that are not achievable in conventional systems that operate using batch systems.

Figure 13:
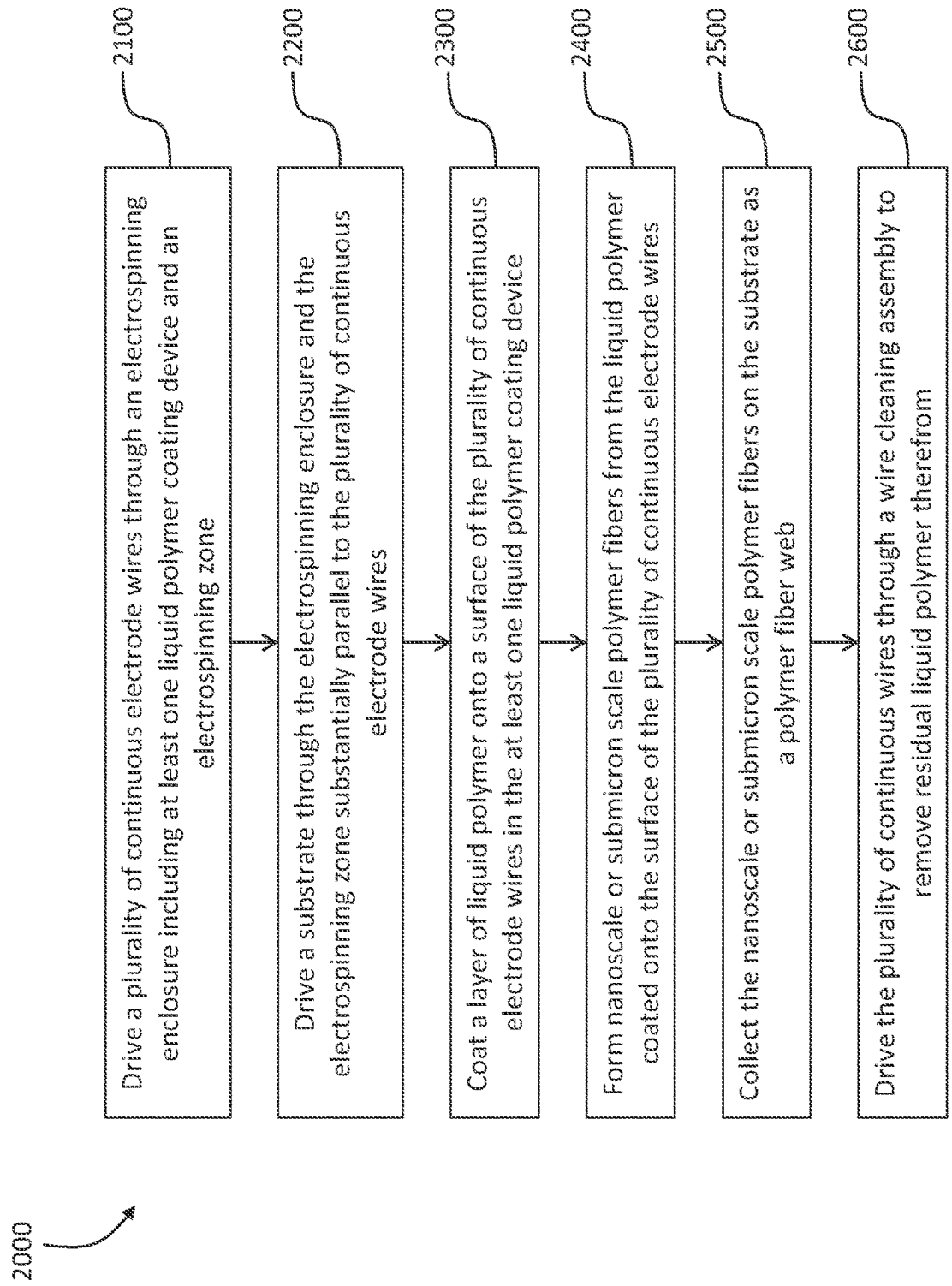
FIG. 13 is a block diagram illustrating a method for continuous needleless electrospinning of a liquid polymer source into a nanoscale or submicron scale polymer fiber web according to an aspect of the disclosure.

Methods for Continuous Needleless Electrospinning of a Liquid Polymer Source Into a Nanoscale or Submicron Scale Polymer Fiber Web The present disclosure further relates to methods for continuous needleless electrospinning of a liquid polymer source into a nanoscale or submicron scale polymer fiber web. The methods incorporate components of the apparatus 100 described herein, the description and operation of which will not be duplicated here, and the reference numbers for these components will be used when referring to their incorporation into the methods. With reference to FIG. 13, in one aspect the method 2000 includes, at 2100, driving a plurality of continuous electrode wires through an electrospinning enclosure including at least one liquid polymer coating device and an electrospinning zone with a wire drive system located external to the electrospinning enclosure. Step 2200 includes driving a substrate through the electrospinning enclosure and the electrospinning zone substantially parallel to the plurality of continuous electrode wires with a substrate conveyor system located external to the electrospinning enclosure. At step 2300 a layer of liquid polymer is coated onto a surface of the plurality of continuous electrode wires in the at least one liquid polymer coating device. At step 2400 nanoscale or submicron scale polymer fibers are formed in the electrospinning zone from the liquid polymer coated onto the surface of the plurality of continuous electrode wires. Step 2500 includes collecting the nanoscale or submicron scale polymer fibers on the substrate as a polymer fiber web. At step 2600 residual polymer is removed from the surface of the plurality of continuous electrode wires using a wire cleaning assembly located within the electrospinning apparatus.

Other aspects may be, but do not have to be, included in the method 2000 described herein, including but not limited to: measuring the resistance of one or more of the plurality of continuous electrode wires using a resistance measuring system 560; recycling liquid polymer and providing liquid polymer feed using a liquid polymer recycle and feed system 1200; preparing liquid polymer using a liquid polymer preparation system 1300; storing and supplying solvent using a solvent storage and supply system 1400; collecting, scrubbing and/or cleaning vapors using a vapor collection and solvent recovery system 1600; blowing draft gas onto the plurality of continuous electrode wires and/or drying gas/hot gas onto the substrate/polymer fiber web as described above; using a substrate conveyor system 150 for moving the substrate through the electrospinning enclosure and winding the substrate and polymer fiber web (either separately or in combination) onto rollers; using emission control boxes 1800A, B, C to minimize entry of air into the electrospinning enclosure; and scrubbing the plurality of continuous electrode wires with a wire scrubber 1900.

Figure 14:
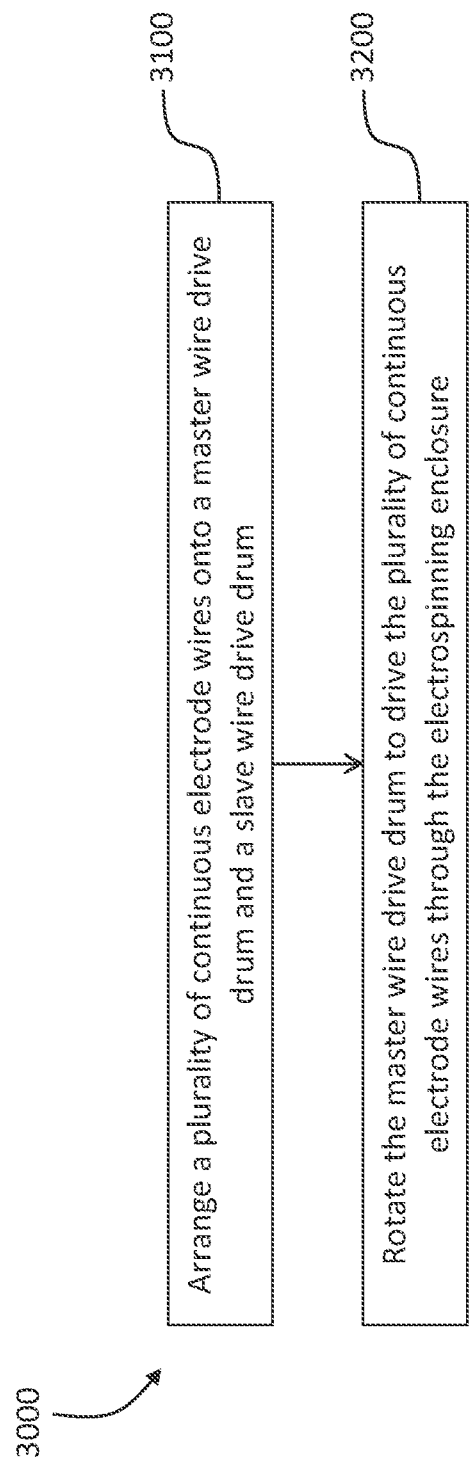
FIG. 14 is a block diagram illustrating a method for driving a plurality of continuous electrode wires through an electrospinning apparatus according to an aspect of the disclosure.

Methods for Driving a Plurality of Continuous Electrode Wires Through an Electrospinning Apparatus The present disclosure further relates to methods for driving a plurality of continuous electrode wires through an electrospinning apparatus. The methods incorporate components of the apparatus 100 described herein, the description and operation of which will not be duplicated here, and the reference numbers for these components will be used when referring to their incorporation into the methods. The electrospinning apparatus 100 includes an electrospinning enclosure 300 within which a nanoscale or submicron scale polymer fiber web 110 is formed onto a substrate 120 from a liquid polymer layer coated onto a plurality of continuous electrode wires 1000. With reference to FIG. 14, in some aspects the method 3000 includes, at 3100, arranging a plurality of continuous electrode wires onto a master wire drive drum and a slave wire drive drum. Each of the master wire drive drum and the slave wire drive drum include a plurality of wire guides, and each of the wire guides include a channel or groove for receiving one of the plurality of continuous electrode wires. At step 3200 the master wire drive drum is rotated to drive the plurality of continuous electrode wires through the electrospinning enclosure. The master wire drive drum and the slave wire drive drum are external to the electrospinning apparatus.

Figure 15:
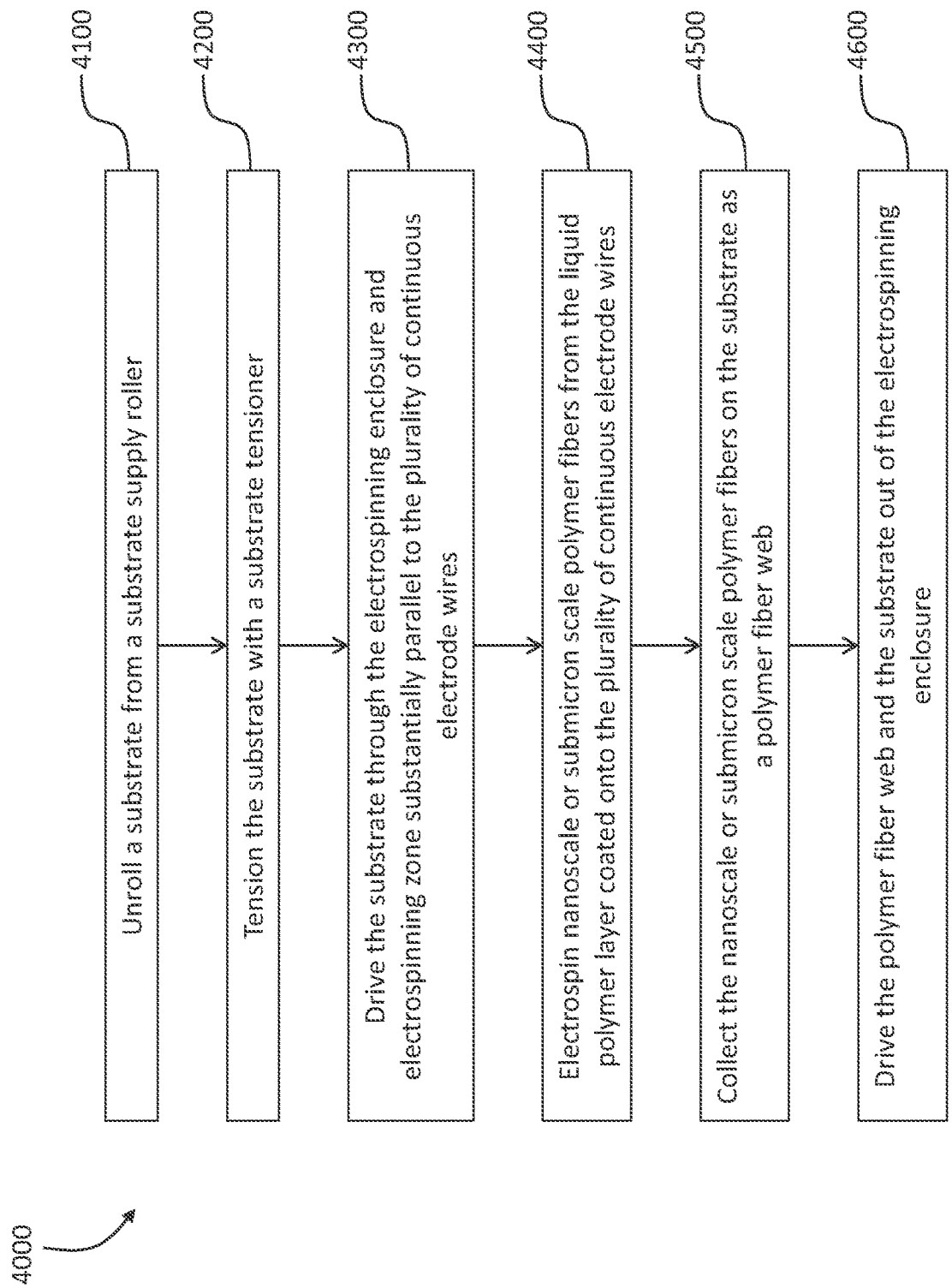
FIG. 15 is a block diagram illustrating a method for collecting a nanoscale or submicron scale polymer fiber web from an electrospinning enclosure according to an aspect of the disclosure.

Other aspects may be, but do not have to be, included in the method 3000, including but not limited methods of operating those systems and components described herein.
Methods for Collecting a Nanoscale or Submicron Scale Polymer Fiber Web from an Electrospinning Enclosure The present disclosure further relates to methods for collecting a nanoscale or submicron scale polymer fiber web from an electrospinning enclosure. The methods incorporate components of the apparatus 100 described herein, the description and operation of which will not be duplicated here, and the reference numbers for these components will be used when referring to their incorporation into the methods. The electrospinning apparatus 100 includes an electrospinning enclosure 300 and electrospinning zone Z within which the nanoscale or submicron scale polymer fiber web 110 is formed onto a substrate 120 from a liquid polymer layer coated onto a plurality of continuous electrode wires 1000. With reference to FIG. 15, in some aspects the method 4000 includes, at 4100, unrolling the substrate from a substrate supply roller. At step 4200 the substrate is tensioned with a substrate tensioner. The substrate is driven through the electrospinning enclosure and electrospinning zone substantially parallel to the plurality of continuous electrode wires having the liquid polymer layer coated thereon at 4300. At step 4400 nanoscale or submicron scale polymer fibers are electrospun from the liquid polymer layer coated onto the plurality of continuous electrode wires in the electrospinning zone. The nanoscale or submicron scale polymer fibers are collected on the substrate as a polymer fiber web at step 4500. At step 4600 the polymer fiber web and the substrate are driven out of the electrospinning enclosure.

Figure 16:
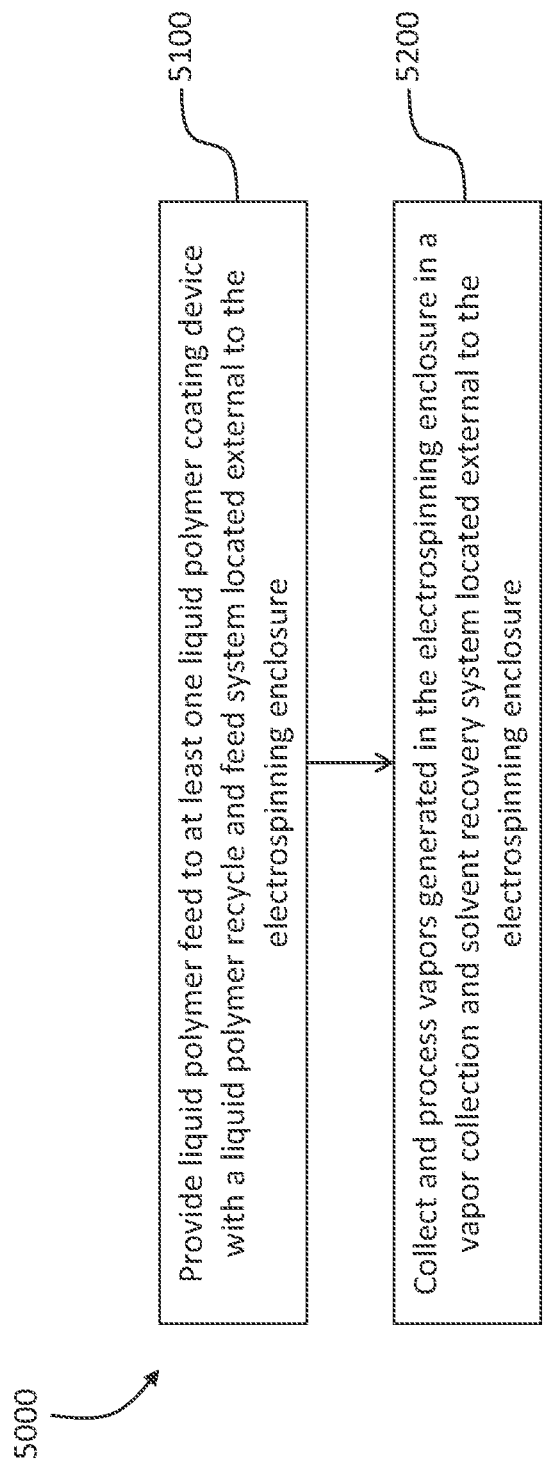
FIG. 16 is a block diagram illustrating a method for operating an electrospinning apparatus for continuous needleless electrospinning a nanoscale or submicron scale polymer fiber web onto a substrate.

Other aspects may be, but do not have to be, included in the method 4000, including but not limited methods of operating those systems and components described herein.
Methods for Operating an Electrospinning Apparatus for Continuous Needleless Electrospinning a Nanoscale or Submicron Scale Polymer Fiber Web Onto a Substrate The present disclosure further relates to methods for operating an electrospinning apparatus for continuous needleless electrospinning a nanoscale or submicron scale polymer fiber web onto a substrate. The methods incorporate components of the apparatus 100 described herein, the description and operation of which will not be duplicated here, and the reference numbers for these components will be used when referring to their incorporation into the methods. The electrospinning apparatus 100 includes an electrospinning enclosure 300 including at least one liquid polymer coating device 400 and an electrospinning zone Z and a wire drive system 600 located external to the electrospinning enclosure 300. The wire drive system 600 drives a plurality of continuous electrode wires 1000 through the electrospinning enclosure 300 and the at least one liquid polymer coating device 400 and electrospinning zone Z located therein. With reference to FIG. 16, in some aspects the method 5000 includes, at 5100, providing liquid polymer feed to the at least one liquid polymer coating device with a liquid polymer recycle and feed system located external to the electrospinning enclosure. At step 5200 vapors generated in the electrospinning enclosure are collected and processed in a vapor collection and solvent recovery system located external to the electrospinning enclosure. The vapor collection and solvent recovery system maintains a pressure in the electrospinning enclosure that is lower than atmospheric pressure.

Other aspects may be, but do not have to be, included in the method 5000, including but not limited to methods of operating those systems and components described herein.

Various combinations of elements of this disclosure are encompassed by this disclosure, e.g., combinations of elements from dependent claims that depend upon the same independent claim.

EXAMPLES OF THE DISCLOSURE

In various aspects, the present disclosure pertains to and includes at least the following examples.

Example 1: A continuous wire drive system for a needleless electrospinning apparatus, the electrospinning apparatus comprising an electrospinning enclosure and within which a nanoscale or submicron scale polymer fiber web is formed onto a substrate from a liquid polymer layer coated onto a plurality of continuous electrode wires passing through the electrospinning enclosure, the continuous wire drive system comprising a master wire drive drum and a slave wire drive drum, each of the master wire drive drum and slave wire drive drum comprising a plurality of wire guides, each of the wire guides comprising a channel or groove for receiving one of the plurality of continuous electrode wires, wherein the continuous wire drive system is external to the electrospinning apparatus, and the continuous wire drive system drives the plurality of continuous electrode wires through the electrospinning enclosure.

Example 2: The continuous wire drive system according to Example 1, further comprising a wire tensioning system for providing tension to the plurality of continuous electrode wires.

Example 3: The continuous wire drive system according to Example 2, wherein the wire tensioning system independently tensions each of the plurality of continuous electrode wires.

Example 4: The continuous wire drive system according to Example 3, wherein the wire tensioning system comprises an independent tensioner for each of the plurality of continuous electrode wires.

Example 5: The continuous wire drive system according to any of Examples 1 to 4, wherein each of the plurality of continuous electrode wires have a length of from about 5 meters to about 50 meters.

Example 6: The continuous wire drive system according to any of Examples 1 to 5, wherein the master wire drive drum comprises a master gear plate and the slave wire drive drum comprises a slave gear plate coupled to the master gear plate such that rotation of the master wire drive drum in a first rotational direction causes the slave wire drive drum to rotate in a second rotational direction opposite the first rotational direction.

Example 7: The continuous wire drive system according to Example 6, wherein the master wire drive drum is coupled to a motor-driven shaft that rotates the master wire drive drum in the first rotational direction.

Example 8: The continuous wire drive system according to Example 7, wherein the motor-driven shaft rotates the master wire drive drum in the first rotational direction in a speed such that the plurality of continuous electrode wires are driven through the electrospinning enclosure at a speed of from about 1 meter per minute (m/min) to about 200 m/min.

Example 9: The continuous wire drive system according to any of Examples 1 to 5, wherein the master wire drive drum is coupled to the slave wire drive drum with a chain such that rotation of the master wire drive drum in a first rotational direction causes the slave wire drive drum to rotate in a second rotational direction opposite the first rotational direction.

Example 10: The continuous wire drive system according to Example 9, wherein the master wire drive drum is coupled to a motor-driven shaft that rotates the master wire drive drum in the first rotational direction.

Example 11: The continuous wire drive system according to any of Examples 1 to 10, wherein the plurality of continuous electrode wires comprises at least 25 wires.

Example 12: The continuous wire drive system according to any of Examples 1 to 11, wherein the plurality of continuous electrode wires comprises from 25 to 500 wires.

Example 13: The continuous wire drive system according to any of Examples 1 to 12, wherein the plurality of continuous electrode wires are spaced between 5 millimeters (mm) and 50 mm apart.

Example 14: The continuous wire drive system according to any of Examples 1 to 13, wherein
the electrospinning enclosure comprises at least one liquid polymer coating device including a supply of liquid polymer, and
the continuous wire drive system drives the plurality of continuous electrode wires through the at least one liquid polymer coating device to cause the plurality of continuous electrode wires to be coated with a layer of the liquid polymer.

Example 15: A method for driving a plurality of continuous electrode wires through an electrospinning apparatus comprising an electrospinning enclosure and within which a nanoscale or submicron scale polymer fiber web is formed onto a substrate from a liquid polymer layer coated onto the plurality of continuous electrode wires, the method comprising:
arranging a plurality of continuous electrode wires onto a master wire drive drum and a slave wire drive drum, each of the master wire drive drum and the slave wire drive drum comprising a plurality of wire guides, each of the wire guides comprising a channel or groove for receiving one of the plurality of continuous electrode wires, and
rotating the master wire drive drum to drive the plurality of continuous electrode wires through the electrospinning enclosure,
wherein the master wire drive drum and the slave wire drive drum are external to the electrospinning apparatus.

Example 16: The method according to Example 15, further comprising tensioning the plurality of continuous electrode wires with a wire tensioning system.

Example 17: The method according to Example 15 or 16, further comprising independently tensioning each of the plurality of continuous electrode wires with a wire tensioning system.

Example 18: The method according to Example 17, wherein the wire tensioning system comprises an independent tensioner for each of the plurality of continuous electrode wires.

Example 19: The method according to any of Examples 15 to 18, wherein each of the plurality of continuous electrode wires have a length of from about 5 meters to about 50 meters.

Example 20: The method according to any of Examples 15 to 19, wherein the master wire drive drum comprises a master gear plate and the slave wire drive drum comprises a slave gear plate coupled to the master gear plate such that rotating the master wire drive drum in a first rotational direction causes the slave wire drive drum to rotate in a second rotational direction opposite the first rotational direction.

Example 21: The method according to Example 20, wherein the master wire drive drum is coupled to a motor-driven shaft that rotates the master wire drive drum in the first rotational direction.

Example 22: A method for collecting a nanoscale or submicron scale polymer fiber web from an electrospinning enclosure comprising an electrospinning zone and within which a nanoscale or submicron scale polymer fiber web is formed onto a substrate from a liquid polymer layer coated onto a plurality of continuous electrode wires, the method comprising:
unrolling the substrate from a substrate supply roller;
tensioning the substrate with a substrate tensioner;
driving the substrate through the electrospinning enclosure and electrospinning zone substantially parallel to the plurality of continuous electrode wires having the liquid polymer layer coated thereon;
electrospinning nanoscale or submicron scale polymer fibers from the liquid polymer layer coated onto the plurality of continuous electrode wires in the electrospinning zone;
collecting the nanoscale or submicron scale polymer fibers on the substrate as a polymer fiber web; and
driving the polymer fiber web and the substrate out of the electrospinning enclosure.

Example 23: The method according to Example 22, further comprising winding the substrate and polymer fiber web onto a combination roller.

Example 24: The method according to Example 22, further comprising separating the polymer fiber web from the substrate, winding the polymer fiber web onto a fiber web roller, and winding the substrate onto a substrate finishing roller.

Example 25: The method according to any of Examples 22 to 24, further comprising applying a drying gas to the substrate in the electrospinning enclosure to facilitate drying of the substrate and the polymer fiber web formed thereon.

Example 26: The method according to Example 25, wherein the drying gas comprises primary drying gas applied in a primary drying region through a primary distribution manifold.

Example 27: The method according to Example 26, wherein the drying gas further comprises secondary drying gas applied in a secondary drying region through a secondary distribution manifold.

Example 28: The method according to Example 27, wherein the secondary drying gas has a relatively lower solvent vapor content and a relatively higher temperature than the primary drying gas.

Example 29: The method according to any of Examples 22 to 28, further comprising using at least one substrate re-direction roller to change a travelling direction of the substrate as it is unrolled from the substrate supply roller.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific aspects in which the disclosure can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

That which is claimed is:

1. A method for collecting a nanoscale or submicron scale polymer fiber web (110) from an electrospinning enclosure (300) of a needleless electrospinning apparatus (100) comprising a continuous wire drive system (600), the electrospinning apparatus (100) comprising an electrospinning enclosure (300) and within which a nanoscale or submicron scale polymer fiber web (110) is formed onto a substrate (120) from a liquid polymer layer coated onto a plurality of continuous electrode wires (1000) passing through the electrospinning enclosure (300), the continuous wire drive system (600) comprising a master wire drive drum (610) and a slave wire drive drum (620), each of the master wire drive drum (610) and slave wire drive drum (620) comprising a plurality of wire guides (670), each of the wire guides comprising a channel or groove for receiving one of the plurality of continuous electrode wires (1000), wherein the continuous wire drive system is external to the electrospinning apparatus (100), and the continuous wire drive system (600) drives the plurality of continuous electrode wires (1000) through the electrospinning enclosure (300);

wherein the electrospinning enclosure (300) comprises an electrospinning zone (Z), the method comprising:

unrolling the substrate (120) from a substrate supply roller (200);

tensioning the substrate (120) with a substrate tensioner (130);

driving the substrate (120) through the electrospinning enclosure (300) and electrospinning zone (Z) substantially parallel to the plurality of continuous electrode wires (1000) having the liquid polymer layer coated thereon;

electrospinning nanoscale or submicron scale polymer fibers from the liquid polymer layer coated onto the plurality of continuous electrode wires (1000) in the electrospinning zone (Z);

collecting the nanoscale or submicron scale polymer fibers on the substrate (120) as a polymer fiber web (110); and driving the polymer fiber web (110) and the substrate (120) out of the electrospinning enclosure (300).

2. The method according to claim 1, further comprising winding the substrate (120) and polymer fiber web (110) onto a combination roller.

3. The method according to claim 1, further comprising separating the polymer fiber web (110) from the substrate (120), winding the polymer fiber web (110) onto a fiber web roller, and winding the substrate (120) onto a substrate finishing roller (230).

4. The method according to claim 1, further comprising applying a drying gas to the substrate (120) in the electrospinning enclosure (300) to facilitate drying of the substrate (120) and the polymer fiber web (110) formed thereon.

5. The method according to claim 4, wherein the drying gas comprises primary drying gas applied in a primary drying region through a primary distribution manifold (1690A).

6. The method according to claim 5, wherein the drying gas further comprises secondary drying gas applied in a secondary drying region through a secondary distribution manifold (1690B).

* * * * *